(12) United States Patent
Lambrache

(10) Patent No.: US 11,436,166 B2
(45) Date of Patent: Sep. 6, 2022

(54) DATA PROCESSING SYSTEMS

(71) Applicant: Arm Limited, Cambridge (GB)

(72) Inventor: Emil Lambrache, Prescott, AZ (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/267,804

(22) Filed: Feb. 5, 2019

(65) Prior Publication Data
US 2020/0250111 A1   Aug. 6, 2020

(51) Int. Cl.
*G06F 3/00*   (2006.01)
*G06F 13/16*   (2006.01)
*G06T 1/20*   (2006.01)

(52) U.S. Cl.
CPC ............ *G06F 13/1668* (2013.01); *G06T 1/20* (2013.01)

(58) Field of Classification Search
CPC .................................................. G06F 13/1668
USPC ............................................................ 710/5
See application file for complete search history.

(56) References Cited

U.S. PATENT DOCUMENTS

| | | | | |
|---|---|---|---|---|
| 5,799,163 A * | 8/1998 | Park | .................... | G06F 9/30109 712/205 |
| 5,907,716 A * | 5/1999 | Yoshimura | ................ | G06F 7/76 710/54 |
| 6,931,472 B1 * | 8/2005 | Kondo | ................... | G06F 13/122 710/310 |
| 7,334,091 B1 * | 2/2008 | Mizrahi | ..................... | G06F 5/06 710/52 |
| 2008/0155135 A1 * | 6/2008 | Garg | ..................... | G06F 13/126 710/25 |
| 2010/0306426 A1 * | 12/2010 | Boonstra | ................... | G06F 5/12 710/57 |
| 2013/0145124 A1 * | 6/2013 | Qiu | ....................... | G06F 9/3455 712/208 |
| 2016/0034409 A1 * | 2/2016 | Kim | ..................... | G06F 13/404 710/110 |

* cited by examiner

*Primary Examiner* — Chun Kuan Lee
(74) *Attorney, Agent, or Firm* — Vierra Magen Marcus LLP

(57) ABSTRACT

A processor comprises an execution unit operable to execute programs to perform processing operations, and one or more slave accelerators each operable to perform respective processing operations under the control of the execution unit. The execution unit includes a message generation circuit that generates messages to cause a slave accelerator to perform a processing operation. The message generation circuit fetches data values for including in a message or messages to be sent to a slave accelerator into local storage of the message generation circuit pending the inclusion of those data values in a message that is sent to a slave accelerator, and retrieves the data value or values from the local storage, and sends a message including the retrieved data value or values to the slave accelerator.

13 Claims, 11 Drawing Sheets

| Cycles | Instruction | Fetch Operand | Storage locked to | Message Out | Storage Released |
|---|---|---|---|---|---|
| | | Static Allocation, 7 LUT entries, 1 instruction at a time | | | |
| 1 | Instruction 0 | Source Operand 0 All Threads | I0 Source Operand 0 -entry 0 | Bubble | |
| 2 | | Source Operand 1 All Threads | I0 Source Operand 1 -entry 1 | Bubble | |
| 3 | | Source Operand 2 All Threads | I0 Source Operand 2 -entry 2 | Bubble | |
| 4 | | Staging Register1/2 - Thread Subgroup A | I0 Staging Reg Thread Subgroup A-ent 3 | Bubble | |
| 5 | | Staging Register3/4 - Thread Subgroup A | I0 Staging Reg Thread Subgroup A-ent 4 | Thread Subgroup A Quad0 Reg 1/2 | |
| 6 | | Staging Register1/2 -Thread Subgroup B | I0 Staging Reg Thread Subgroup B-ent 5 | Thread Subgroup A Quad0 Reg 3/4 | |
| 7 | | Staging Register3/4 -Thread Subgroup B | I0 Staging Reg Thread Subgroup B-ent 6 | Thread Subgroup A Quad1 Reg 1/2 | |
| 8 | | Bubble | | Thread Subgroup A Quad1 Reg 3/4 | |
| 9 | | Bubble | | Thread Subgroup B Quad0 Reg 1/2 | |
| 10 | | Bubble | | Thread Subgroup B Quad0 Reg 3/4 | |
| 11 | | Bubble | | Thread Subgroup B Quad1 Reg 1/2 | |
| 12 | | Bubble | | Thread Subgroup B Quad1 Reg 3/4 | ent 0,1,2,3,4,5,6 |
| 13 | Instruction 1 | Source Operand 0 All Threads | I1 Source Operand 0 -entry 0 | Bubble | |
| 14 | | Source Operand 1 All Threads | I1 Source Operand 1 -entry 1 | Bubble | |
| 15 | | Source Operand 2 All Threads | I1 Source Operand 2 -entry 2 | Bubble | |
| 16 | | Staging Register1/2 - Thread Subgroup A | I1 Staging Reg Thread Subgroup A-ent 3 | Bubble | |
| 17 | | Staging Register3/4 - Thread Subgroup A | I2 Staging Reg Thread Subgroup A-ent 4 | Thread Subgroup A Quad0 Reg 1/2 | |
| 18 | | Staging Register1/2 -Thread Subgroup B | I1 Staging Reg Thread Subgroup B-ent 5 | Thread Subgroup A Quad0 Reg 3/4 | |
| 19 | | Staging Register3/4 -Thread Subgroup B | I1 Staging Reg Thread Subgroup B-ent 6 | Thread Subgroup A Quad1 Reg 1/2 | |
| 20 | | Bubble | | Thread Subgroup A Quad1 Reg 3/4 | |
| 21 | | Bubble | | Thread Subgroup B Quad0 Reg 1/2 | |
| 22 | | Bubble | | Thread Subgroup B Quad0 Reg 3/4 | |
| 23 | | Bubble | | Thread Subgroup B Quad1 Reg 1/2 | |
| 24 | | Bubble | | Thread Subgroup B Quad1 Reg 3/4 | ent 0,1,2,3,4,5,6 |
| 25 | Instruction 2 | Source Operand 0 All Threads | I2 Source Operand 0 -entry 0 | Bubble | |
| 26 | | Source Operand 1 All Threads | I2 Source Operand 1 -entry 1 | Bubble | |
| 27 | | Source Operand 2 All Threads | I2 Source Operand 2 -entry 2 | Bubble | |
| 28 | | Staging Register1/2 - Thread Subgroup A | I2 Staging Reg Thread Subgroup A-ent 3 | Bubble | |
| 29 | | Staging Register3/4 - Thread Subgroup A | I2 Staging Reg Thread Subgroup A-ent 4 | Thread Subgroup A Quad0 Reg 1/2 | |
| 30 | | Staging Register1/2 -Thread Subgroup B | I2 Staging Reg Thread Subgroup B-ent 5 | Thread Subgroup A Quad0 Reg 3/4 | |
| 31 | | Staging Register3/4 -Thread Subgroup B | I2 Staging Reg Thread Subgroup B-ent 6 | Thread Subgroup A Quad1 Reg 1/2 | |
| 32 | | Bubble | | Thread Subgroup A Quad1 Reg 3/4 | |
| 33 | | Bubble | | Thread Subgroup B Quad0 Reg 1/2 | |
| 34 | | Bubble | | Thread Subgroup B Quad0 Reg 3/4 | |
| 35 | | Bubble | | Thread Subgroup B Quad1 Reg 1/2 | |
| 36 | | Bubble | | Thread Subgroup B Quad1 Reg 3/4 | ent 0,1,2,3,4,5,6 |

Fig. 7

| Cycles | Instruction | Fetch Operand | Static Allocation, 5 LUI entries per instruction, 2 instructions in flight | | Message Out | Storage Released |
|---|---|---|---|---|---|---|
| | | | Storage for Even Instructions | Storage for Odd Instructions | | |
| 1 | Instruction 0 | I0 Source Operand 0 All Threads | I0 Source Operand 0 - entry 0 | | Bubble | |
| 2 | | I0 Source Operand 1 All Threads | I0 Source Operand 1 - entry 1 | | Bubble | |
| 3 | | I0 Source Operand 2 All Threads | I0 Source Operand 2 - entry 2 | | Bubble | |
| 4 | | I0 Staging Register 1/2 - Thread Subgroup A | I0 Staging Reg Thread Subgroup A - ent 3 | | Bubble | |
| 5 | | I0 Staging Register 3/4 - Thread Subgroup A | I0 Staging Reg Thread Subgroup A - ent 4 | | I0 - Thread Subgroup A Quad0 - Reg 1/2 | |
| 6 | | Bubble | | | I0 - Thread Subgroup A Quad0 - Reg 3/4 | |
| 7 | | Bubble | | | I0 - Thread Subgroup A Quad1 - Reg 1/2 | |
| 8 | | Bubble | | | I0 - Thread Subgroup A Quad1 - Reg 3/4 | entry 3,4 |
| 9 | | I0 Staging Register 1/2 - Thread Subgroup B | I0 Staging Reg Thread Subgroup B - ent 3 | | Bubble | |
| 10 | | I0 Staging Register 3/4 - Thread Subgroup B | I0 Staging Reg Thread Subgroup B - ent 4 | | I0 - Thread Subgroup B Quad0 - Reg 1/2 | |
| 11 | Instruction 1 | I1 Source Operand 0 All Threads | | I1 Source Operand 0 - entry 5 | I0 - Thread Subgroup B Quad0 - Reg 3/4 | |
| 12 | | I1 Source Operand 1 All Threads | | I1 Source Operand 1 - entry 6 | I0 - Thread Subgroup B Quad1 - Reg 1/2 | |
| 13 | | I1 Source Operand 2 All Threads | | I1 Source Operand 2 - entry 7 | I0 - Thread Subgroup B Quad1 - Reg 3/4 | entry 0,1,2,3,4 |
| 14 | | I1 Staging Register 1/2 - Thread Subgroup A | | I1 Staging Reg Thread Subgroup A - ent 8 | Bubble | |
| 15 | | I1 Staging Register 3/4 - Thread Subgroup A | | I1 Staging Reg Thread Subgroup A - ent 9 | I1 - Thread Subgroup A Quad0 - Reg 1/2 | |
| 16 | | Bubble | | | I1 - Thread Subgroup A Quad0 - Reg 3/4 | |
| 17 | | Bubble | | | I1 - Thread Subgroup A Quad1 - Reg 1/2 | |
| 18 | | Bubble | | | I1 - Thread Subgroup A Quad1 - Reg 3/4 | entry 8,9 |
| 19 | | I1 Staging Register 1/2 - Thread Subgroup B | | I1 Staging Reg Thread Subgroup B - ent 8 | Bubble | |
| 20 | | I1 Staging Register 3/4 - Thread Subgroup B | | I1 Staging Reg Thread Subgroup B - ent 9 | I1 - Thread Subgroup B Quad0 - Reg 1/2 | |
| 21 | Instruction 2 | I2 Source Operand 0 All Threads | I2 Source Operand 0 - entry 0 | | I1 - Thread Subgroup B Quad0 - Reg 3/4 | |
| 22 | | I2 Source Operand 1 All Threads | I2 Source Operand 1 - entry 1 | | I1 - Thread Subgroup B Quad1 - Reg 1/2 | |
| 23 | | I2 Source Operand 2 All Threads | I2 Source Operand 2 - entry 2 | | I1 - Thread Subgroup B Quad1 - Reg 3/4 | entry 5,6,7,8,9 |
| 24 | | I2 Staging Register 1/2 - Thread Subgroup A | I2 Staging Reg Thread Subgroup A - ent 3 | | Bubble | |
| 25 | | I2 Staging Register 3/4 - Thread Subgroup A | I2 Staging Reg Thread Subgroup A - ent 4 | | I2 - Thread Subgroup A Quad0 - Reg 1/2 | |
| 26 | | Bubble | | | I2 - Thread Subgroup A Quad0 - Reg 3/4 | |
| 27 | | Bubble | | | I2 - Thread Subgroup A Quad1 - Reg 1/2 | |
| 28 | | Bubble | | | I2 - Thread Subgroup A Quad1 - Reg 3/4 | |
| 29 | | I0 Staging Register 1/2 - Thread Subgroup B | I2 Staging Reg Thread Subgroup B - ent 3 | | Bubble | |
| 30 | | I0 Staging Register 3/4 - Thread Subgroup B | I2 Staging Reg Thread Subgroup B - ent 4 | | I2 - Thread Subgroup B Quad0 - Reg 1/2 | |
| 31 | | Bubble | | | I2 - Thread Subgroup B Quad0 - Reg 3/4 | |
| 32 | | Bubble | | | I2 - Thread Subgroup B Quad1 - Reg 1/2 | |
| 33 | | Bubble | | | I2 - Thread Subgroup B Quad1 - Reg 3/4 | |

Fig. 8

| Cycles | Instruction | Fetch Operand | Storage entry used | Message out | Storage Released |
|---|---|---|---|---|---|
| 1 | Instruction 0 | Source Operand 0 All Threads | Entry 0 | | |
| 2 | | Source Operand 1 All Threads | Entry 1 | | |
| 3 | | Source Operand 2 All Threads | Entry 2 | Bubble | |
| 4 | | Staging Register 1/2 - Thread Subgroup A | Entry 3 | Bubble | |
| 5 | | Staging Register 3/4 - Thread Subgroup A | Entry 4 | I0 - Thread Subgroup A Quad0 - Reg 1/2 | |
| 6 | | Staging Register 1/2 - Thread Subgroup B | Entry 5 | I0 - Thread Subgroup A Quad0 - Reg 3/4 | |
| 7 | | Staging Register 3/4 - Thread Subgroup B | Entry 6 | I0 - Thread Subgroup A Quad1 - Reg 1/2 | |
| 8 | | Bubble | | I0 - Thread Subgroup A Quad1 - Reg 3/4 | Entry 3,4 |
| 9 | Instruction 1 | Source Operand 0 All Threads | Entry 3 | I0 - Thread Subgroup B Quad0 - Reg 1/2 | |
| 10 | | Source Operand 1 All Threads | Entry 4 | I0 - Thread Subgroup B Quad0 - Reg 3/4 | |
| 11 | | Bubble | | I0 - Thread Subgroup B Quad1 - Reg 1/2 | |
| 12 | | Bubble | | I0 - Thread Subgroup B Quad1 - Reg 3/4 | Entry 0,1,2,5,6 |
| 13 | | Source Operand 2 All Threads | Entry 0 | Bubble | |
| 14 | | Staging Register 1/2 - Thread Subgroup A | Entry 1 | Bubble | |
| 15 | | Staging Register 3/4 - Thread Subgroup A | Entry 2 | I1 - Thread Subgroup A Quad0 - Reg 1/2 | |
| 16 | | Staging Register 1/2 - Thread Subgroup B | Entry 5 | I1 - Thread Subgroup A Quad0 - Reg 3/4 | |
| 17 | | Staging Register 3/4 - Thread Subgroup B | Entry 6 | Figure | |
| 18 | | Bubble | | I1 - Thread Subgroup A Quad1 - Reg 1/2 | Entry 1,2 |
| 19 | Instruction 2 | Source Operand 0 All Threads | Entry 1 | I1 - Thread Subgroup A Quad1 - Reg 3/4 | |
| 20 | | Source Operand 1 All Threads | Entry 2 | I1 - Thread Subgroup B Quad0 - Reg 1/2 | |
| 21 | | Bubble | | I1 - Thread Subgroup B Quad0 - Reg 3/4 | |
| 22 | | Bubble | | I1 - Thread Subgroup B Quad1 - Reg 1/2 | Entry 0,3,4,5,6 |
| 23 | | Bubble | | I1 - Thread Subgroup B Quad1 - Reg 3/4 | |
| 24 | | Source Operand 2 All Threads | Entry 0 | Bubble | |
| 25 | | Staging Register 1/2 - Thread Subgroup A | Entry 3 | Bubble | |
| 26 | | Staging Register 3/4 - Thread Subgroup A | Entry 4 | I2 - Thread Subgroup A Quad0 - Reg 1/2 | |
| 27 | | Staging Register 1/2 - Thread Subgroup B | Entry 5 | I2 - Thread Subgroup A Quad0 - Reg 3/4 | |
| 28 | | Staging Register 3/4 - Thread Subgroup B | Entry 6 | I2 - Thread Subgroup A Quad1 - Reg 1/2 | |
| 29 | | | | I2 - Thread Subgroup A Quad1 - Reg 3/4 | Entry 3,4 |
| 30 | | | | I2 - Thread Subgroup B Quad0 - Reg 1/2 | |
| 31 | | | | I2 - Thread Subgroup B Quad0 - Reg 3/4 | |
| 32 | | | | I2 - Thread Subgroup B Quad1 - Reg 1/2 | |
| 33 | | | | I2 - Thread Subgroup B Quad1 - Reg 3/4 | Entry 0,1,2,5,6 |

Fig. 12

DATA PROCESSING SYSTEMS

BACKGROUND

The technology described herein relates to data processing systems, and in particular to arrangements for the execution of graphics processing operations in a graphics processing unit of a graphics processing system.

Graphics processing is typically carried out in a pipelined fashion, with one or more pipeline stages operating on the data to generate the final render output, e.g. frame that is displayed. Many graphics processing pipelines now include one or more so-called "shading" stages, commonly referred to as "shaders". For example, a graphics processing pipeline may include one or more of, and typically all of, a geometry shader, a vertex shader and a fragment (pixel) shader. These shaders are processing stages that execute shader programs on input data values to generate a desired set of output data (e.g. appropriately shaded and rendered fragment data in the case of a fragment shader) for processing by the rest of the graphics pipeline and/or for output.

A graphics "shader" thus performs graphics processing operations by running small programs for each graphics item in a graphics output to be rendered, such as a render target, e.g. frame (an "item" in this regard is usually a vertex or a sampling position (e.g. in the case of a fragment shader)). This generally enables a high degree of parallelism, in that a typical render output, e.g. frame, features a rather large number of vertices and fragments, each of which can be processed independently.

In graphics shader operation, each "item" will be processed by means of an execution thread which executes the shader program for the graphics "item" in question.

Modern graphics processing units (graphics processors) accordingly typically comprise one or more programmable execution units that can execute shader programs to perform graphics processing operations, together with one or more "slave" accelerators (processing units), such as a varying interpolator, a texture mapper and a blender, which accelerators perform, e.g., specific graphics processing operations, such as varying interpolation, texture mapping, and blending, under the control of the programmable execution unit.

FIG. 1 shows schematically such an arrangement of a graphics processing unit 1. As shown in FIG. 1, the graphics processing unit 1 includes a thread creator 2, a thread group manager 3, an execution unit 4, and a plurality of slave accelerators, shown schematically in FIG. 1 as comprising a varying interpolator 6, a texture mapper 7, and "other" accelerators 8, with which the execution unit 4 can communicate via an appropriate message bus (bus matrix) 5. The execution unit 4 also has (contains) the register file (set of registers) 9.

The varying interpolator 6 operates to perform varying processing operations, such as interpolating values across graphics primitives.

The texture mapper 7 operates to perform graphics texture mapping operations, such as sampling graphics textures using texture coordinates, and producing therefrom a filtered texture sample result (which it can then return to the execution unit for use, e.g. when shading sampling points).

The other accelerators 8 schematically represents other accelerator units that can be called upon by the execution unit 4 to perform processing operations. Such other accelerators may comprise, for example, a blender e.g. that is operable to blend fragment shading results generated by the execution unit 4 with previously generated fragment shader results. These other accelerators could also comprise, e.g., dedicated, hardware, load and store units, etc.

In this arrangement, the execution unit 4 executes graphics shading programs, such as fragment shading programs, to perform graphics processing operations, such as shading (rendering) fragments.

As part of this processing, and as shown in FIG. 1, the execution unit 4 can call upon the varying interpolator 6, the texture mapper 7 and other accelerators 8 to perform specific, e.g. graphics, processing operations. To do this, the execution unit 4 will send appropriate messages to the relevant accelerator (and receive the appropriate response therefrom), via the message bus 5, e.g. in response to specific instructions in a shader program that it is executing.

In operation of the graphics processing unit 1 shown in FIG. 1, the thread creator 2 will generate (spawn) appropriate execution threads for processing the desired graphics "items" to be processed for a shader program (such as graphics fragments in the case of a fragment shader program) for execution by the execution unit 4. (The execution unit 4 has a SIMD (single instruction, multiple data) architecture.)

The thread group manager 3 organises the threads created by the thread creator 2 into appropriate thread groups for execution by the execution unit 4. The thread group manager will control the issue of threads as respective thread groups to the execution unit 4 for execution.

(It is assumed in this regard that the graphics processing unit 1 is configured to execute execution threads as respective groups of execution threads, where the threads of one group are run in lockstep, e.g. one (and the same) instruction at a time. In this way, it is possible to share instruction fetch and scheduling resources between all the threads in the group. Other terms used for such thread groups include "warps" and "wavefronts". For convenience, the term "thread group" will be used herein, but this is intended to encompass all equivalent terms and arrangements, unless otherwise indicated.)

The execution unit 4 will then execute the appropriate shader program for each thread that it receives from the thread creator 2 (via the thread group manager 3) to process the graphics work items in question to produce the desired render output.

Once the execution unit 4 has finished its processing for a given thread (using the responses, if any, from the various slave accelerators, such as the varying interpolator 6, and the texture mapper 7), the resulting thread value or values (e.g. shaded fragment (sampling position) value) can be written out to memory, e.g. for output.

As described above, and as shown in FIG. 1, the execution unit 4 is able to send messages to the slave accelerators, such as the varying interpolator 6 or texture mapper 7, to perform processing operations. As part of this operation, the execution unit 4 will prepare and send appropriate messages for the required operations to the slave accelerator via the message bus 5. Such messages should convey to the slave accelerators the information that they require for performing the desired slave accelerator operation, including, in particular, the necessary operand (input) values to be used for the operation in question. To do this, the execution unit will, for example, fetch the required operands (their values) from storage (e.g. the register file) where they are stored, and then convey those operands in an appropriate message or messages to the slave accelerator in question.

The Applicants believe that there remains scope for improved arrangements for conveying such messages to slave accelerators of a graphics processor.

BRIEF DESCRIPTION OF THE DRAWINGS

A number of embodiments of the technology described herein will now be described by way of example only and with reference to the accompanying drawings, in which:

FIG. 7 shows schematically a first embodiment of the use of the local storage of the message generation circuit;

FIG. 8 shows schematically a second embodiment of the use of the local storage of the message generation circuit;

FIG. 12 shows schematically the use of the local storage of the message generation circuit of FIG. 9.

Like reference numerals are used for like components where appropriate in the drawings.

DETAILED DESCRIPTION

Figure 1:
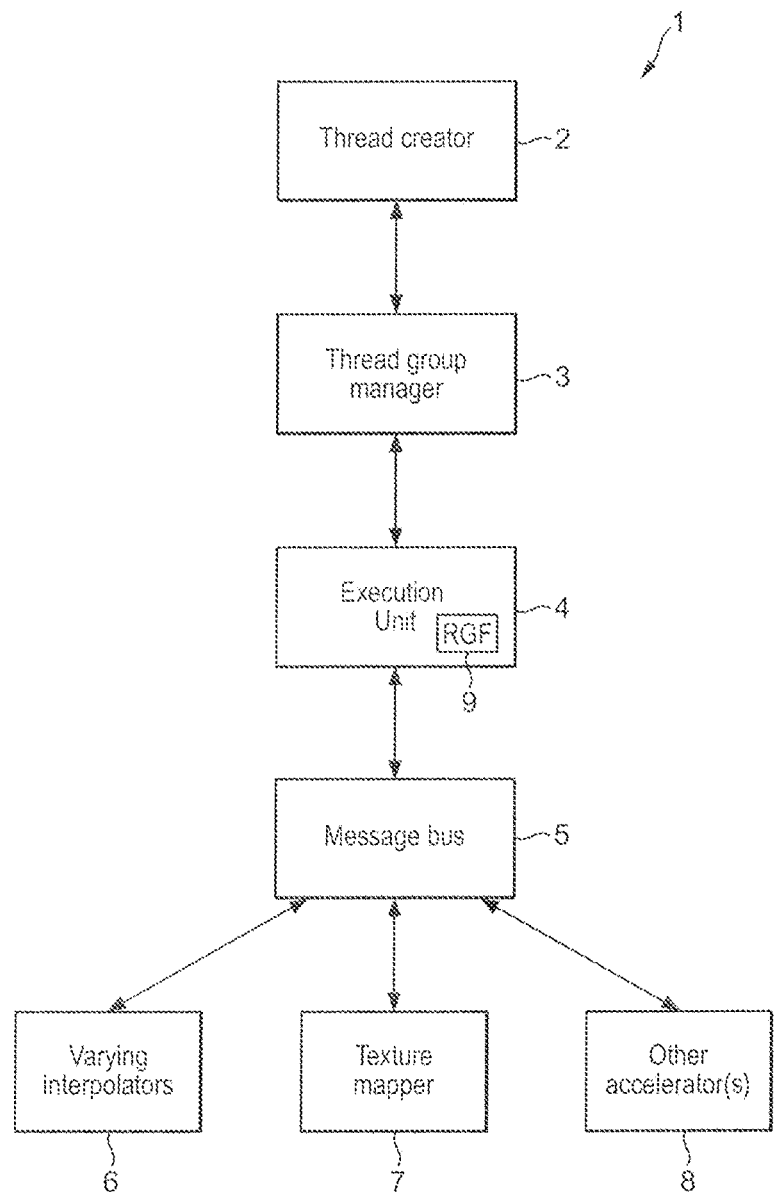
FIG. 1 shows schematically a graphics processing unit.

A first embodiment of the technology described herein comprises a graphics processor comprising:

an execution unit operable to execute graphics processing programs to perform graphics processing operations; and one or more slave accelerators each operable to perform respective processing operations;

wherein:

the execution unit is operable to communicate with the slave accelerators to cause the slave accelerators to perform processing operations, and to receive responses from the slave accelerators;

and the execution unit comprises:

a message generation circuit configured to generate messages for sending to a slave accelerator to cause the slave accelerator to perform a processing operation;

the message generation circuit comprising:

local storage operable to store data values for including in a message or messages to be sent to a slave accelerator pending the inclusion of those data values in a message that is sent to a slave accelerator;

a data fetching circuit configured to fetch into the local storage of the message generation circuit data values to be used by a slave accelerator when performing a processing operation;

and a message sending circuit configured to, when a message including a data value or values is to be sent to a slave accelerator, retrieve the data value or values for inclusion in the message to be sent to the slave accelerator from the local storage of the message generation circuit, and send a message including the retrieved data value or values to the slave accelerator.

A second embodiment of the technology described herein comprises a method of operating a graphics processor, the graphics processor comprising:

an execution unit operable to execute graphics processing programs to perform graphics processing operations; and one or more slave accelerators each operable to perform respective processing operations;

wherein:

the execution unit is operable to communicate with the slave accelerators to cause the slave accelerators to perform processing operations, and to receive responses from the slave accelerators;

and the execution unit comprises:

a message generation circuit configured to generate messages for sending to a slave accelerator to cause the slave accelerator to perform a processing operation, the message generation circuit comprising local storage operable to store data values for including in a message or messages to be sent to a slave accelerator pending the inclusion of those data values in a message that is sent to a slave accelerator;

the method comprising:

when a message including a data value or values is to be sent to a slave accelerator:

fetching the data value or values for inclusion in the message to be sent to the slave accelerator into the local storage of the message generation circuit;

retrieving the data value or values from the local storage of the message generation circuit;

and sending a message including the retrieved data value or values to the slave accelerator.

The technology described herein relates to graphics processors that include both an execution unit that can execute (shader) programs to perform processing operations and one or more slave accelerators (such as a varying interpolator, a texture mapper and a blender). In the technology described herein, the execution unit includes a message generation circuit that is operable to generate messages for conveying, inter alia, data, to the slave accelerators, when the slave accelerators are to perform processing operations under the control of the execution unit.

In the technology described herein, the message generation circuit of the execution unit includes local storage operable to store (operand) data values fetched for including in messages to be sent to the slave accelerators, pending those data values being included in a message that is sent to a slave accelerator.

As will be discussed further below, providing such local storage for (operand) data values in the message generation circuit facilitates more efficient conveying of data values to the slave accelerators when slave accelerator operations are required, in particular in the case where, for example, the message generation circuit is able to fetch data values for including in messages at a greater rate than it is able to include those data values in messages to the slave accelerators, and/or in the situation where the order (pattern) of fetching data values for inclusion in messages for slave accelerators is different to the order (pattern) in which it is desired to send the fetched data values to the slave accelerators.

The technology described herein can, for example, avoid the need to repeatedly fetch the same data values from storage for use when generating a sequence of messages conveying data values to a slave accelerator for use in a processing operation by that slave accelerator.

The execution unit can be any suitable and desired execution unit (execution engine) that can execute graphics processing (shader) programs to perform graphics processing operations (that can fetch and execute instructions in a graphics processing (shader) program) (and that a graphics processor may contain).

Thus the execution unit should be able to, and in an embodiment does, fetch, interpret, and execute instructions from a (shader) program stored in memory, and it should, and in an embodiment does, comprise an appropriate execution circuit (circuitry) that is operable to and configured to receive execution threads to be executed, and execute appropriate graphics shading programs for those threads to generate a desired graphics output. It accordingly should be able to, and in an embodiment does, have direct access to the instruction memory and the register file, and should accordingly, and in an embodiment does, contain (comprise) the register file and the program counters for each thread being executed.

The execution unit can execute any suitable and desired shader program, such as a vertex shader, fragment shader or a compute shader (e.g. according to OpenCL or Direct Compute).

In an embodiment, the execution unit is configured to execute shader programs for execution threads as respective groups of execution threads, i.e. such that execution threads executing a program to perform data processing operations are grouped together into thread groups (warps) in which the plural threads of a thread group each execute a set of instructions in lockstep.

Correspondingly, any processing (functional) units of the execution unit (the execution circuit) are in an embodiment configured and operable so as to facilitate such thread group arrangements. For example, the execution circuit is in an embodiment arranged as respective execution lanes, one for each thread that a thread group may contain (such that, for example, for a system in which execution threads are grouped into groups (warps) of sixteen threads, the execution circuit may be operable as sixteen respective (and identical) execution lanes), so that the execution unit (and circuit) can execute the same instruction in parallel for each thread of a thread group.

Thus, the execution unit in an embodiment comprises execution processing circuitry (an execution circuit) operable to execute instructions to perform processing operations for execution threads executing a program, with the execution processing circuitry (circuit) being configured as a plurality of execution lanes, each execution lane being operable to perform processing operations for a respective execution thread of a thread group.

There may be a single or plural execution units. Where there are plural execution units, each execution unit can in an embodiment operate in the manner of the technology described herein.

The slave accelerator(s) of the graphics processor can be any suitable and desired, e.g. special purpose, accelerators that a graphics processor may include (that, e.g., and in an embodiment, act as graphics-specific accelerators).

There may be a single or plural slave accelerators. In an embodiment the graphics processor includes plural, in an embodiment different, slave accelerators.

In an embodiment, the slave accelerator(s) comprise one or more of, and in an embodiment all of: a varying interpolation circuit (a varying interpolator), a texture mapping circuit (a texture mapper), a blending circuit (a blender), a load and/or store circuit (unit), and an arithmetic circuit or circuits (unit or units), etc.

The slave accelerators are in an embodiment fixed-function units (circuits) (i.e. hardware that is configured to perform the specific slave operations in question). Thus the slave accelerators should not and in an embodiment do not have direct access either to the instruction memory or the register file.

The execution unit is able to communicate with the slave accelerator(s) of the graphics processor, and in particular is able to send messages to the slave accelerator(s) to trigger their processing operations. The execution unit in an embodiment can, and in an embodiment does, receive corresponding responses from the slave accelerators.

The slave accelerators are correspondingly and in an embodiment configured and operable to perform processing operations in response to messages received from the execution unit, and to return appropriate responses to the execution unit.

There is correspondingly and in an embodiment an appropriate message bus (network) (e.g. bus matrix) arranged between the execution unit and the accelerators, for conveying messages from the execution unit to the accelerators (and vice-versa).

The sending of messages to a slave accelerator by the execution unit can be triggered in any desired and suitable manner. In an embodiment, this is achieved by including an appropriate "message" instruction in a shader program to be executed by the execution unit, that when executed will trigger the execution unit to send an appropriate message or messages to the slave accelerator in question (with the execution unit sending the message(s) when it reaches the relevant instruction in the shader program). Thus, a shader program will include various types of instruction, one of which type is a "message instruction" that will trigger the operation in the manner of the technology described herein.

Thus, in an embodiment, the technology described herein comprises (and the overall graphics processing system includes appropriate processing circuitry (circuit) configured to) issuing to the execution unit of the graphics processor a shader program for execution by the execution unit that includes one or more "message" instructions to cause the execution unit to issue a message to a slave accelerator to cause the slave accelerator to perform a processing operation, with the execution unit, when executing the shader program, when it reaches such an instruction in the shader program, issuing one or more messages to a slave accelerator to cause that slave accelerator to perform the required processing operation or operations.

Such message instructions could be included in a shader program to be executed by the execution unit in any suitable and desired manner. In an embodiment, such instructions are included in a shader program by the compiler (the shader compiler) for the graphics processor. The compiler may, e.g., and in an embodiment, be run as part of the driver operation for the graphics processor. Other arrangements would, of course, be possible.

The message instructions that trigger the sending of message(s) to an accelerator can take any suitable and desired form.

In an embodiment, they indicate the operation to be performed (and thus the accelerator to be used for that operation).

The message instructions should, and in an embodiment do, indicate one or more operands (inputs) for the instruction (and that will accordingly be operands (inputs) for the processing operation that the accelerator is to perform). In an embodiment a message instruction can indicate (and have) a plurality of operands.

In an embodiment, the message instructions that trigger the sending of messages to a slave accelerator can include (indicate) two different types of operand (input), a first set of operands (a first operand type) (which may be referred to as "source operands"), which contain data values that are to be and need to be processed in some manner, and a second set of operands (a second, different operand type) that contain data that is to be sent to the slave accelerator for processing in its as fetched form (i.e. unmodified) (which may be referred to as "staging operands").

In this case, a "source operand" in an embodiment has its own register file address.

On the other hand, a "staging operand" is in an embodiment part of a contiguous group of operands in the register file, which can be, and is in an embodiment, accessed by "indexed addressing" (i.e. an arrangement in which only the base address of the staging operand group and how many entries (staging operands) there are in the group is indicated (in the message instruction), with the execution unit then determining the actual register file address for each staging operand (register) in the group as a linear sweep starting at the base address and having the prescribed number of address increments). The staging operands may, and in an embodiment do, contain vector data referring to a vertex, or RGBA components (colour+transparency) of a sampling position.

In an embodiment, each message instruction in the shader program that can trigger a processing operation using a slave accelerator can have up to a particular, in an embodiment selected, in an embodiment predetermined, number of source operands, and up to a particular, in an embodiment selected, in an embodiment predetermined, number of staging operands. In an embodiment a message instruction has 1 to N source operands (with N in an embodiment being 4) and 0 to M staging operands (with M in an embodiment being 8). Other arrangements would, of course, be possible. In an embodiment, each message instruction indicates the number of source operands and the number of staging operands that the message instruction has associated with it.

In response to a message instruction in a shader program it is executing, the execution unit will generate and send to the appropriate slave accelerator, an appropriate sequence of one or more messages to cause the slave accelerator to perform the desired processing operation. The execution unit will identify the accelerator to use (to send the message(s) to) based on the operation that the message instruction requires to be performed.

The message(s) that are sent from the execution unit to the accelerator should convey the information that is required to perform the required processing operation. Thus, they should, if necessary, indicate the processing operation to be performed, and include and convey any required operand data (values) to be used by the slave accelerator for the processing operation in question.

The messages that are sent from the execution unit to the accelerator in an embodiment have two parts, a header and a payload. The header in an embodiment contains the operation (opcode), any modifiers, and information about the size, type and number of values included in the subsequent payload. The payload should, and in an embodiment does, then contain the input operand data (values).

Each message that is sent from the execution unit to an accelerator in an embodiment includes all the necessary input data for the accelerator to perform the required processing operation within it (within its code), such as, and in an embodiment, an indication of the processing operation to be performed (in an embodiment as an opcode), any "modifiers", input operand data (values), and the address where the output of the accelerator processing operation should be stored.

The messages can be viewed as being "fixed format instructions" which include all the necessary input data for the slave accelerator (and may, e.g., be part of a very small instruction set specific to the slave accelerator in question). As the messages include all the necessary input data themselves, there should be, and is in an embodiment, no need for the slave accelerators to be able to, and to, perform any register file fetching.

The messages that are sent to the accelerators are generated and sent by a message generation circuit of the execution unit. Thus, when a message instruction is executed in a shader program (e.g. by the execution circuit), that will be indicated to the message generation circuit, so that it can generate and send the required message(s) to the slave accelerator in question. In an embodiment the message instruction is decoded, and the necessary information from the instruction, such as the slave accelerator operation that is required and the identity (addresses) of the operands for that operation, is provided to the message generation circuit.

The message generation circuit can be configured in any suitable and desired manner and can contain any suitable and desired elements and components (processing circuits/logic) to allow it to operate in the manner of the technology described herein (to, in particular, generate appropriate messages for sending to an accelerator in response to appropriate message instructions requiring slave accelerator operations in a shader program being executed by the execution unit of the graphics processor).

The message generation circuit includes an appropriate data fetching circuit that performs a data fetching process to fetch the operand data (values) into the local storage of the message generation circuit. The data fetching circuit can take any suitable and desired form. In an embodiment it is in the form of an operand fetch controller, in an embodiment in the form of a finite state machine.

The data fetching circuit (operand fetch controller) in an embodiment receives the decoded message instruction indicating that slave accelerator operation is required (and the particular slave accelerator operation that is required), together with the identity of the operands for that operation (for the message instruction).

The data fetching circuit will and in an embodiment does, then fetch the required operand data (values) into the local storage of the message generation circuit.

To do this, the message generation circuit in an embodiment comprises an appropriate data request interface (e.g. bus matrix) via which the data fetching circuit can send requests for operand data from the storage (e.g., and in an embodiment register file) of the execution unit where that data is stored. In an embodiment the data fetching circuit sends a request indicating the address of the operand data that is required to the data request interface, with the data request interface then operating to fetch the data for the indicated address.

The message generation circuit in an embodiment also comprises a corresponding response interface (e.g. bus matrix) that interfaces with the local storage of the message generation circuit, via which the requested operand data (values) is returned and stored in the local storage of the message generation circuit.

The message generation circuit also comprises a message sending circuit that generates the actual messages that are sent to the accelerators (and that, inter alia, is operable to retrieve message operand data (values) from the local storage of the message generation circuit for inclusion in the messages that it generates for sending to the accelerators). Again, this message sending circuit can take any suitable and desired form. In an embodiment it is in the form of a message generation controller, in an embodiment in the form of a finite state machine.

In an embodiment, there is also a communication path between the data fetching circuit (e.g. controller) and the message sending circuit (e.g. message generation controller) for conveying the particular operation that is being performed to the message sending circuit. The message sending circuit will use this information to identify the operation and thus the accelerator to be used when generating messages, and, correspondingly, the operands whose values should be included in the messages.

The execution unit could comprise a single message generation circuit of the form of the technology described herein (and in one embodiment, that is the case). In another embodiment, the execution unit comprises plural such message generation circuits, each operable to generate respective messages. In this case, each particular message generation circuit is in an embodiment configured and operable to generate messages for a particular accelerator or accelerators only. For example, there may be one message generation circuit for the varying interpolator, one for the texture mapper, and one for any other accelerators that the graphics processor has access to.

As discussed above, in the technology described herein, when data for a processing operation is to be sent to an accelerator, the message generation circuit fetches the data (operand values) for including in messages to be sent to the slave accelerators into local storage of the message generation circuit, before then including the fetched data in messages that are sent to the slave accelerators. Thus, the message generation circuit will operate to fetch the required number of, e.g., source operands and staging operands for the message instruction when generating the messages to send to the slave accelerator to perform the processing operation.

The message generation circuit (the data fetching circuit of the message generation circuit) will, and in an embodiment does, fetch the data (operand values) from storage where that data is stored. It in an embodiment fetches the data from local storage of and/or associated with the execution unit, in an embodiment from a register file of and/or associated with the execution unit. In an embodiment the data (values) is fetched from the register file where data (values) for use by the execution unit is stored.

The data values are in an embodiment fetched into the local storage of the message generation circuit over an appropriate data bus (e.g. bus matrix) between the execution circuit of the execution unit and the message generation circuit of the execution unit. As discussed above, this data bus (bus matrix) is in an embodiment configured to have a data request interface between the data fetching circuit and the execution circuit (the local storage (register file)) of the execution unit, and a data response interface between the local storage of the message generation circuit and the execution circuit (the local storage (register file)) of the execution unit.

In an embodiment, the message generation circuit is able to, and configured to, fetch in a single fetch cycle, e.g., and in an embodiment from the register file, a total amount of data that corresponds to a single operand value for each thread of a thread group (of the size that the execution unit is configured to handle). Thus, for example, where the execution unit is configured to process threads as groups (warps) of 16 threads, and each operand is a 32-bit value, the message generation circuit is in an embodiment able to fetch 16×32=512 bits of data in a single fetch cycle.

Thus the message bus (the message fabric) that conveys data from the local storage, e.g., and in an embodiment register files, of the execution unit to the local storage of the message generation circuit is in an embodiment able to handle a full thread group (warp) width payload in a single fetch cycle.

In an embodiment, the message generation circuit is able to fetch a single operand value (and in an embodiment the value of the same operand) for each thread of a thread group in a single cycle. This would then allow, for example, the message generation circuit to fetch the value of a particular operand for each of the threads in a thread group in a single fetch cycle. In this case, in an embodiment the value of the same (single) operand is fetched for each thread of the thread group. Thus, in the case where a thread group (warp) comprises 16 threads, this mode of operation will fetch sixteen values of a particular operand, one for each thread in the thread group.

In an embodiment, the message generation circuit is also or instead (and in an embodiment also) able to fetch plural operand values for each thread of a subset of threads of a thread group (such as two operand values for a subset comprising half the threads of a thread group, or four operand values for a subset comprising a quarter of a thread group) in a single fetch cycle. This would then allow, for example, the values for plural different operands to be fetched for each thread of a subset of the threads of a thread group in a single fetch cycle.

In an embodiment, the message generation circuit supports plural, and can be set (in use) to fetch data in any one of plural, "data fetching" modes, e.g., and in an embodiment, to fetch a value of a single operand for each of the threads in a thread group in a fetch cycle, or to fetch the values for plural different operands for a subset of a thread group in a single fetch cycle.

In an embodiment, the message generation circuit is also or instead (and in an embodiment also) able to fetch two operand values for each thread of a subset of threads of a thread group (and in an embodiment two operand values for a subset comprising half the threads of a thread group) in a single fetch cycle. This would then allow, for example, the values for two different operands to be fetched for each thread of half the threads of a thread group in a single fetch cycle.

In this case, the message generation circuit can in an embodiment be configured and set to fetch two operand values either for a subset comprising the lower half of the threads of a thread group, or for a subset comprising the upper half of the threads of a thread group. Thus, for example, and in an embodiment, where there are sixteen threads in a thread group, subdivided into four quads of four threads each, in this mode of operation, the message generation circuit will either fetch the (two) operand values for the threads in the lower two quads of the thread group, or for the threads in the higher two quads of the thread group. In an embodiment the message generation circuit can be set to perform either a "low" or a "high" fetch when operating in this manner.

In an embodiment, the message generation circuit supports all of, and can be set (in use) to fetch data in any of, the above three "data fetching" modes, i.e. to fetch a value of a single operand for each of the threads in a thread group in a fetch cycle, or to fetch the values for two different operands for either the "low" half or the "high" half of a thread group in a single fetch cycle.

The operand data for the instructions in a shader program being executed is in an embodiment stored in an appropriate distributed and interleaved fashion in the local storage, e.g. register file (and across different register banks of the register file), of the execution unit, so as to facilitate the message generation circuit being able to fetch operand data from that local storage (the register file) using these different data fetching modes.

In an embodiment, the data values of "source operands" (as discussed above) are fetched by fetching the value of the source operand in question for each thread of a thread group in a single fetch cycle. The source operand values are in an embodiment stored in the register file in such a manner so as to facilitate such fetching of those values by the message generation circuit.

On the other hand, the values of "staging operands" for execution threads are in an embodiment fetched as respective groups (e.g. pairs) of staging operands for each thread of a subset (e.g. half, as discussed above) of the threads of a thread group. Thus, in an embodiment, the values of, e.g., two staging operands will be fetched for, e.g., either the lower half or the upper half of a thread group in a single fetch cycle. The staging operand values are correspondingly in an embodiment stored in the register file in such a manner so as facilitate such fetching from the register file by the message generation circuit.

In an embodiment, the registers that store the staging operands use an index direct addressing scheme, where the first register storing a staging operand has a first address (e.g. B), and the rest of the staging operands (registers) are located at consecutive increasing addresses (so B+1, B+2, B+3, . . . , B+M). In this case, the message instruction in the shader program in an embodiment specifies the address of the first staging operand register and the number of staging operands (registers) to fetch.

Once the necessary operand data for a message instruction has been fetched into the local storage of the message generation circuit, the message generation circuit then includes that data appropriately in a message or messages that are sent to the slave accelerator in question for the slave accelerator to then perform the desired processing operation using the operand data.

In an embodiment, each message that is sent to a slave accelerator has the capacity to convey less operand data than the amount of operand data that is (able to be) fetched into the local storage of the message generator circuit in a single fetch cycle. For example, and in an embodiment, each message may be used to (and have the capacity to) convey the value of a particular operand for only a subset of the threads of a thread group, and in an embodiment for only a subset of 4 threads (for a quad) of a thread group. In this case therefore, each message sent by the message generation circuit to a slave accelerator will include (and be able to convey) four operand values (so 4×32=128 bits of data where 32 bit operands are being used).

(In general, the operand capacity of the messages that are sent to the slave accelerators may be based, for example, on message bus bandwidth and access considerations. For example, smaller message payloads may mean bus bandwidth is relatively wasted with the message headers, but too large a message payload may result in the message bus being blocked by a single slave, thereby starving the other slaves.)

The message bus (e.g. bus matrix) between the message generation circuit and the slave accelerators could be configured to be able to support as many such messages as are needed to convey all the data that can be fetched by the message generation circuit in a single cycle (so four such messages in the case of sixteen thread wide thread groups (warps), where each message conveys operand values for a quad of four threads).

However, in an embodiment, the message generation circuit is only able to send fewer messages than would be necessary to convey all the data that is fetched into the local storage of the message generation circuit in a single cycle to a slave accelerator or accelerators in a single cycle. In an embodiment the message generation circuit can send either a single message or two messages only in a single cycle.

This avoids the need to provide a message bus (e.g. bus matrix) between the message generation circuit of the execution unit and the slave accelerators that is able to support (very) wide data transfers in a single cycle (which may be undesirable, for example, from a silicon area perspective), but will have the effect that the rate at which data can be fetched by the message generation circuit is faster than the rate at which that data can be sent out in messages to slave accelerators. The technology described herein compensates for this by having local storage in the message generation circuit that can store fetched operand values pending the inclusion of those operand values in messages that are sent to slave accelerators.

The message generation circuit could be operable to convey operand values to the slave accelerators in the same pattern (order) to the pattern (order) in which the operand values are fetched into the local storage of the message generation circuit.

However, in an embodiment, the message generation circuit is configured to, and operates to, convey operand values to slave accelerators in messages in a different pattern (order) to the pattern (order) in which those operand values are fetched into the local storage of the message generation circuit. In other words, the message generation circuit will fetch operand values into its local storage in a first order, but then send those operand values (in messages) to the slave accelerator in question in a second, different order.

In an embodiment, the message generation circuit is configured to and operates to, convey the operand values for an operation to a slave accelerator on a thread group subset by subset (e.g. quad-by-quad) basis, i.e. such that the values of all the operands required by the slave accelerator are sent to the slave accelerator in appropriate messages for respective subsets (e.g. quads) of threads in turn (i.e. such that the values of all of the operands required by the slave accelerator for a particular subset of threads of a thread group are sent to the accelerator (in appropriate message(s)), before any of the operand values for another subset of the threads of the thread group are sent to the slave accelerator).

(This is because the slave accelerators will typically be (extremely) long pipelines which cannot be made as wide as the execution unit (e.g. for silicon area and/or power consumption reasons), such that the slave accelerators will only be able to operate upon a fraction of a thread group at a time. This accordingly means that a slave accelerator cannot begin processing a particular subset of the threads of a thread group until it has received all the data for that subset, such that it is desirable for the messages sent to the slave accelerators to convey all the required data for one subset of threads, so that the slave accelerator can start processing that subset of threads, before moving on to the next subset of threads (and so on).)

Thus, for example, and in an embodiment, in the case where the threads of a thread group are organised into respective quads of four threads each, the message generation circuit in an embodiment operates to send messages conveying all of the operand values for a first quad of threads of the thread group to the slave accelerator, before then sending all of the operand values for the next quad of the thread group to the slave accelerator, and so on.

Thus, in an embodiment, the operand data is fetched into the local storage of the message generation circuit by fetching the value of each particular operand for plural threads in turn (on an operand-by-operand basis), but then the operand data will be conveyed to the slave accelerator (in appropriate messages by the message generation circuit) by sending the data values for all the operands for respective subsets of threads (on a thread subset by subset basis).

Again, the provision of local storage for storing operand data locally to the message generation circuit while that data is pending inclusion in a message to be sent to a slave accelerator facilitates such reordering of the operand data from the order in which it is fetched (from the register files) into the local storage of the message generation circuit, to the order in which it is included in messages that are sent to the slave accelerators.

The local storage of the message generation circuit of the execution unit can take any suitable and desired form.

In an embodiment it is in the form of a (lookup) table having a plurality of entries, with each entry able to store a particular, in an embodiment selected, in an embodiment predetermined, amount of data. In an embodiment, each entry in the message generation circuit local storage lookup table can store the same amount of data as can be fetched by the message generation circuit (from the register file) in a single fetch cycle (so 512 bits of data in the example discussed above, where a 32-bit operand value can be fetched for each of sixteen threads of a thread group in a single cycle).

Each entry in the local storage lookup table in an embodiment also has state information (metadata) associated with it, such as, and in an embodiment, one or more of, and in an embodiment all of: an index value identifying the entry in the lookup table (the entries are in an embodiment indexed in an (e.g. ascending) numerical order); an indication (flag) indicating whether the entry in question is valid (contains valid data or not); and an indication (flag) indicating whether the entry is free to receive new data (or, correspondingly, is in use (locked) such that the data in the entry should not be overwritten with new data).

The local storage lookup table may support any suitable and desired number of entries. In an embodiment, it comprises between 4 and 16 entries (has a maximum capacity of between 4 to 16 entries, and in an embodiment has a maximum capacity of 8 entries).

Each entry in the lookup table need not necessarily be completely filled with valid data, e.g. depending upon the operand values that have been fetched into that entry.

In an embodiment, where the operands for operation are organised as "source operands" and "staging operands" (as discussed above), the source operands are stored in different local storage lookup table entries to the staging operands (such that a local storage lookup table entry will either store one or more source operand values, or one or more staging operand values but not both).

Correspondingly, the staging operands for a given subset of threads (e.g. quad) are in an embodiment released from the local storage lookup table when the message or messages for the thread group subset that those staging operations apply to have been sent to the slave accelerator, but the source operands will in an embodiment be retained in the local storage lookup table until the appropriate messages for the entire thread group in question (that uses those source operand values have been sent (as source operands will typically be common for an entire thread group (i.e. warp invariant), and so should be and are in an embodiment retained in the local storage lookup table of the message generation circuit until messages for all the subsets (e.g. quads) for a thread group have been sent to the slave accelerator).

In this arrangement, the message sending process (circuit) will read the required data values from a lookup table entry and then include the data from the lookup table entry in one or more messages that it sends to the accelerator.

The message sending process (circuit) may send a single message using data from a lookup table entry. In an embodiment, the message sending process (circuit) sends (a set of) plural messages using data from a lookup table entry (since, as discussed above, typically any given message conveys less data than would be stored in a single lookup table entry, such that the message sending process (circuit) will need to send plural messages to an accelerator in order to convey all the data that is in a lookup table entry to the accelerator). In this case, each message may, and in an embodiment does, contain different data from the lookup table entry in question.

The message sending process (circuit) in an embodiment waits for the required lookup table entry to be indicated (flagged) as containing valid data in the lookup table (which indication should be, and is in an embodiment, set appropriately once the operand values have been fetched and stored into the lookup table entry), before attempting to read the operand values from the lookup table and including then in a message(s).

Correspondingly, once the message sending process (circuit) has finished with a lookup table entry (has finished using the operand values in that entry for messages to a slave accelerator), it in an embodiment de-allocates (frees-up) the lookup table entry in the local storage lookup table so that it can be reused for new operand data. This is in an embodiment done by setting the "free" indication (flag) associated with the lookup table entry in question accordingly.

The operand data may be arranged in the local storage (in the entries in the lookup table) in any suitable and desired manner.

In a first embodiment, there is a static (fixed) mapping between the operands that a message instruction may relate to (the relative operand position for a message instruction) and the entries in the local storage lookup table of the message generation circuit where the values for those operands are stored (i.e. such that for every message instruction, the first operand of the instruction will always be stored in a first particular entry in the lookup table, the second operand for each message instruction will always be stored in a second, different, particular entry in the lookup table, and so on). In other words, the data fetching process (circuit) will always put the same operand position in a message instruction in the same lookup table entry.

In an embodiment, each operand position in the sequence of operands that a message instruction can have has a corresponding, predefined, entry position in the lookup table (e.g. in increasing numerical order). (Thus, the first operand for a message instruction will always be stored in the same, particular, predetermined, entry (e.g. the lowest (first) entry) in the lookup table, the second operand for a message instruction (if any) will always be stored in the same, particular, predetermined, entry (e.g. the second lowest (second) entry) in the lookup table, and so on.)

This can simplify the use and configuration of the local storage lookup table (albeit potentially at the expense of throughput when executing message instructions to send messages to a slave accelerator to perform processing operations).

In one embodiment, the local storage lookup table has sufficient entries and capacity to store operand data (values) for executing a single message instruction for a thread group.

It would, however, be possible to provide additional capacity in the local storage lookup table to support the storage of operand data (values) for plural message instructions simultaneously, if desired. This may then allow the throughput of message instruction processing to be increased, albeit at the expense of using a larger local storage lookup table.

In an embodiment, the local storage lookup table has capacity to store operand data (values) for two instructions (for two thread groups) simultaneously (but still statically allocated to respective operand positions of the instructions).

In this case, the local storage lookup table could be, and is in an embodiment, essentially configured as two parallel lookup tables (to have two parts), with one of the lookup tables (parts) being, in an embodiment statically, allocated to one instruction (e.g. the odd instruction) of a pair of sequential message instructions, with the other lookup table (part) then being allocated to the other instruction (e.g. the even instruction) of the pair (and so on, with the lookup table (part) being used thus changing (alternating) for each successive message instruction that is to be executed). This would then support the execution of two instructions (by two different thread groups (warps)) in flight at any one time.

In an embodiment, rather than having a static mapping between operands ((relative) operand position) and the entries in the message generation circuit local storage lookup table, the mapping between instruction operands and the entries in the lookup table is dynamic, i.e. such that a given operand will be dynamically allocated an entry in the lookup table (for its data) in use. In other words, any operand can be stored in any entry in the lookup table (that is free to store data for that operand). This will allow a higher throughput to be achieved with a smaller local storage (lookup table).

In this case, when the values of an operand are to be fetched into the local storage lookup table, in an embodiment a free entry in that table in which the operand values can be stored is first identified, with the operand values then being fetched and stored in that entry. Correspondingly, the identity of the entry in which the operand values have been stored is in an embodiment conveyed to the message sending process (the message sending circuit), such that the message sending process (message sending circuit) can then identify the correct lookup table entry to retrieve the operand values for inclusion in the message(s) to the accelerator from. This operation can be achieved in any suitable and desired manner.

In an embodiment, when the values of an operand are to be fetched into the local storage lookup table, the data fetching process (the data fetching circuit (operand fetch controller)) first queries the lookup table to identify a free entry in that table in which the operand values will be stored. In an embodiment, the lowest lookup table entry (the lowest index lookup table entry) that is free is selected and allocated for storing the new operand values. (If no entries in the lookup table are free, the fetch of the operand values is in an embodiment stalled until a lookup table entry becomes free.)

Once it has been allocated a lookup table entry, the operand value fetching process (the data fetching circuit (operand fetch controller)) in an embodiment then requests the operand values (from the register file) and sends with (associates with) that request the identity (e.g. index) of the lookup table entry that has been allocated to store the operand values. When the operand data is returned (from the register file) in response to the fetch request, the lookup table entry associated with (sent with) the fetch request is used to identify which lookup table entry to store the returned operand values in, and those operand values are stored in the lookup table in the allocated lookup table entry accordingly.

In an embodiment, the operand request to the request interface includes both the address of the operand data that is required and the identity of the allocated lookup table entry, and the identity of the allocated lookup table entry is transferred to the response interface from the request interface, with the request interface then using that transferred identity of the allocated lookup table entry to identify which lookup table entry to store the returned operand values in.

In addition to sending the identity of the allocated lookup table entry with the operand data fetch request, the identity of the allocated lookup table entry is also in an embodiment conveyed to the message sending process (to the message sending circuit (the message generation controller), such that the message sending process (controller) can then use that identity of the lookup table entry to retrieve the operand values in question from the local storage lookup table.

This is in an embodiment done by the data fetching process (e.g. the operand fetch controller) also writing the identity of the allocated lookup table entry into suitable storage from where message sending process (the message sending circuit) can retrieve the lookup table entry identity to thereby identify the lookup table entry where the operand values are stored when it is assembling messages that require those operand values for sending to a slave accelerator.

In an embodiment, the data fetching process (circuit) (e.g. the operand fetch controller) writes the identity of the allocated lookup table entry into a queue (and in an embodiment a first-in, first-out queue), such as and in an embodiment, a FIFO, from which the message sending process (the message sending circuit) will then retrieve the lookup table entry identity when it is assembling messages that require those operand values for sending to a slave accelerator to thereby identify the lookup table entry where the operand values are stored.

As discussed above, the message sending process (circuit) in an embodiment waits for the indicated lookup table entry to be flagged as containing valid data in the lookup table before attempting to read the operand values from the lookup table and including then in a message(s). To facilitate this, the queue (e.g. FIFO) is in an embodiment sized (sufficiently long) such that the identity of a lookup table entry for the message sending process (circuit) to use should only reach the head of the queue after the lookup table entry in question will have been filled with the required operand data (values).

As discussed above, in embodiments of the technology described herein, the message sending process (circuit) also receives from the data fetching process (circuit) (information indicating) the particular operation that is to be performed using the fetched operand data. In an embodiment, the providing of this operation information and the providing of the identity of the allocated lookup table entries for the respective accelerator operations to the message sending process (circuit) is appropriately coordinated and/or synchronised, such that the identity of the required lookup table entry will be at the head of the queue when the particular operation that is to use the operand values in the entry in question is received by the message sending process (circuit).

Thus, in an embodiment, the accelerator operations that are to be performed will be conveyed to the message sending process (circuit) in a, particular, sequence, and the identities of the allocated lookup table entries for those operations are placed into the queue (and retrieved from the queue by the message sending process (circuit)) in that same, particular, sequence. (In other words, there will be a sequence of "message instructions" in the shader program being executed, and those message instructions will be conveyed to the message sending process (circuit) in that sequence, with the identity of the allocated lookup table entries for each message instruction being placed in the queue in that same sequence (order).)

In the case where the mapping between instruction operands and the entries in the local storage lookup table is dynamic, then the local storage lookup table in an embodiment has a capacity to store operand data values for at least one instruction (for one thread group). In this case, the local storage lookup table in an embodiment has a capacity to store operand data values for two instructions (for two thread groups) simultaneously at most.

Thus, in the case where the mapping between instruction operands and the entries in the local storage lookup table is dynamic, the local storage lookup table in an embodiment has a capacity to store operand data values that is more than the capacity required to store operand values for one instruction (for one thread group), but less than the capacity required to store operand data values for two instructions (for two thread groups) simultaneously.

Once the message generation circuit has sent the appropriate messages to a slave accelerator, then the slave accelerator can, and in an embodiment does, perform the required processing operations using the operand data (values) conveyed in the messages that it has received from the message generation circuit, and then, e.g., and in an embodiment, returns the result of its processing to the execution unit (or otherwise stores or transmits that result) as appropriate. The execution unit may then, for example, continue execution of the shader program in question (beyond the message instruction that triggered the slave accelerator operation), using the results returned by the accelerator, to complete the execution of the shader program and the processing of the work items, etc., in question.

The final result (output) of the shader program execution can then be used as desired, e.g. stored in memory for further processing and/or for display.

The technology described herein can be used for all forms of output that a graphics processor may be used to generate, such as frames (images) for display, render-to-texture outputs, etc. The output, e.g. fragment shaded, data values from the graphics processing are in an embodiment exported to external, e.g. main, memory, for storage and use, such as to a frame buffer for a display.

As well as the particular units (processing stages) discussed above, the graphics processor may also contain any other suitable and desired processing stages and units that a graphics processor and processing pipeline may contain, such as a rasteriser, an early depth (or an early depth and stencil) tester, a renderer (fragment shader), a late depth (or depth and stencil) tester, a tile buffer, a write out unit, etc.

The technology described herein is applicable to any suitable form or configuration of graphics processor. It is particularly applicable to tile-based graphics processors and graphics processing systems. Thus in an embodiment, the graphics processing system and graphics processor are a tile-based system and processor, respectively.

In an embodiment, the various functions of the technology described herein are carried out on a single graphics processing platform that generates and outputs the rendered fragment data that is, e.g., written to the frame buffer for the display device.

As will be appreciated by those skilled in the art, the graphics processor of the technology described herein will be part of an overall graphics processing system that will include, e.g., and in an embodiment, a host processor that, e.g., executes applications that require graphics processing by the graphics processor, and/or a display for displaying images generated by the graphics processor. Thus, the graphics processor may be, and is in an embodiment, in communication with a host microprocessor, and/or with a display for displaying images based on the data generated by the graphics processor.

The host processor will send appropriate commands and data to the graphics processor to control it to perform graphics processing operations and to produce graphics processing (render) output required by applications executing on the host processor. To facilitate this, the host processor should, and in an embodiment does, also execute a driver for the graphics processor and a compiler or compilers for compiling shader programs to be executed by the execution unit of the graphics processor.

The, e.g. graphics, processor and/or system may also comprise, and/or be in communication with, one or more memories and/or memory devices that store the data described herein, and/or the output data generated by the, e.g. graphics, processor, and/or store software for performing the processes described herein.

Although the technology described herein has been described above with particular reference to the execution of shader programs in graphics processing units, the Applicants have recognised and believe that the operation in the manner of the technology described herein and the techniques of the technology described herein may be equally applicable to and can be used in other, e.g. and in an embodiment multi-threaded, processing units and processors that include both an execution unit that can execute programs to perform processing operations and one or more slave accelerators operable to perform processing operations under the control of the execution unit, particularly in the case where there is data transposition involved (a wider data access from, e.g., the register file, compared to the data sending pattern). They may, for example, be applied appropriately to more general processors, such as CPUs (Central Processing Units), if desired.

Thus, another embodiment of the technology described herein comprises
    a processor comprising:
      an execution unit operable to execute programs to perform processing operations; and
      one or more slave accelerators each operable to perform respective processing operations;
    wherein:
      the execution unit is operable to communicate with the slave accelerators to cause the slave accelerators to perform processing operations, and to receive responses from the slave accelerators;

and the execution unit comprises:

a message generation circuit configured to generate messages for sending to a slave accelerator to cause the slave accelerator to perform a processing operation;

the message generation circuit comprising:

local storage operable to store data values for including in a message or messages to be sent to a slave accelerator pending the inclusion of those data values in a message that is sent to a slave accelerator;

a data fetching circuit configured to fetch into the local storage of the message generation circuit data values to be used by a slave accelerator when performing a processing operation;

and a message sending circuit configured to, when a message including a data value or values is to be sent to a slave accelerator, retrieve the data value or values for inclusion in the message to be sent to the slave accelerator from the local storage of the message generation circuit, and send a message including the retrieved data value or values to the slave accelerator.

Another embodiment of the technology described herein comprises a method of operating a processor, the processor comprising:

an execution unit operable to execute programs to perform processing operations; and one or more slave accelerators each operable to perform respective processing operations;

wherein:

the execution unit is operable to communicate with the slave accelerators to cause the slave accelerators to perform processing operations, and to receive responses from the slave accelerators;

and the execution unit comprises:

a message generation circuit configured to generate messages for sending to a slave accelerator to cause the slave accelerator to perform a processing operation, the message generation circuit comprising local storage operable to store data values for including in a message or messages to be sent to a slave accelerator pending the inclusion of those data values in a message that is sent to a slave accelerator;

the method comprising:

when a message including a data value or values is to be sent to a slave accelerator:

fetching the data value or values for inclusion in the message to be sent to the slave accelerator into the local storage of the message generation circuit;

retrieving the data value or values from the local storage of the message generation circuit;

and sending a message including the retrieved data value or values to the slave accelerator.

As will be appreciated by those skilled in the art, these embodiments of the technology described herein can and in an embodiment do include any one or more or all of the features of the technology described herein described herein, as appropriate.

In these embodiments of the technology described herein, the processor (processing unit) can be any suitable processor (processing unit), such as a CPU, or a GPU. The accelerators can correspondingly be any suitable and desired accelerator, e.g. special purpose accelerator, that is operable to perform a given processing operation or operations.

In an example, one or more accelerators could be used in a network processor. The network processor could be implemented with a multi-threaded programmable unit system surrounded, for example, by a number of varying latency accelerators (e.g. CAM, encryption block, etc.). In this case, work could be scheduled by assigning every IP packet (or group of IP packets) to a thread that in turn will generate messages to interact with the accelerator(s).

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, units, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (circuits/circuitry) and/or programmable hardware elements (circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the graphics processing system and processor can otherwise include any one or more or all of the usual functional units, etc., that graphics processing systems include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a, e.g. graphics, processor, or microprocessor system comprising a data processor causes in conjunction with said data processor said processor, or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display.

As discussed above, a graphics processing unit (graphics processor) may typically comprise one or more programmable execution units that can execute shader programs to perform graphics processing operations, together with one or more "slave" accelerators (processing units) which perform specific processing operations under the control of the programmable execution unit. Such a graphics processor arrangement is shown in FIG. 1, and the embodiments of the technology described herein that will now be described can be included and implemented in a graphics processor of the form shown in FIG. 1.

In the present embodiments, in order to facilitate communication between the programmable execution unit of the graphics processor and the slave accelerators, the execution unit includes, as discussed above, a message generation circuit that generates messages for sending to a slave accelerator to cause the slave accelerator to perform a processing operation, which message generation circuit includes, inter alia, local storage operable to store data values fetched for including in messages to be sent to the slave accelerators, pending those data values being included in a message that is sent to a slave accelerator.

Figure 2:
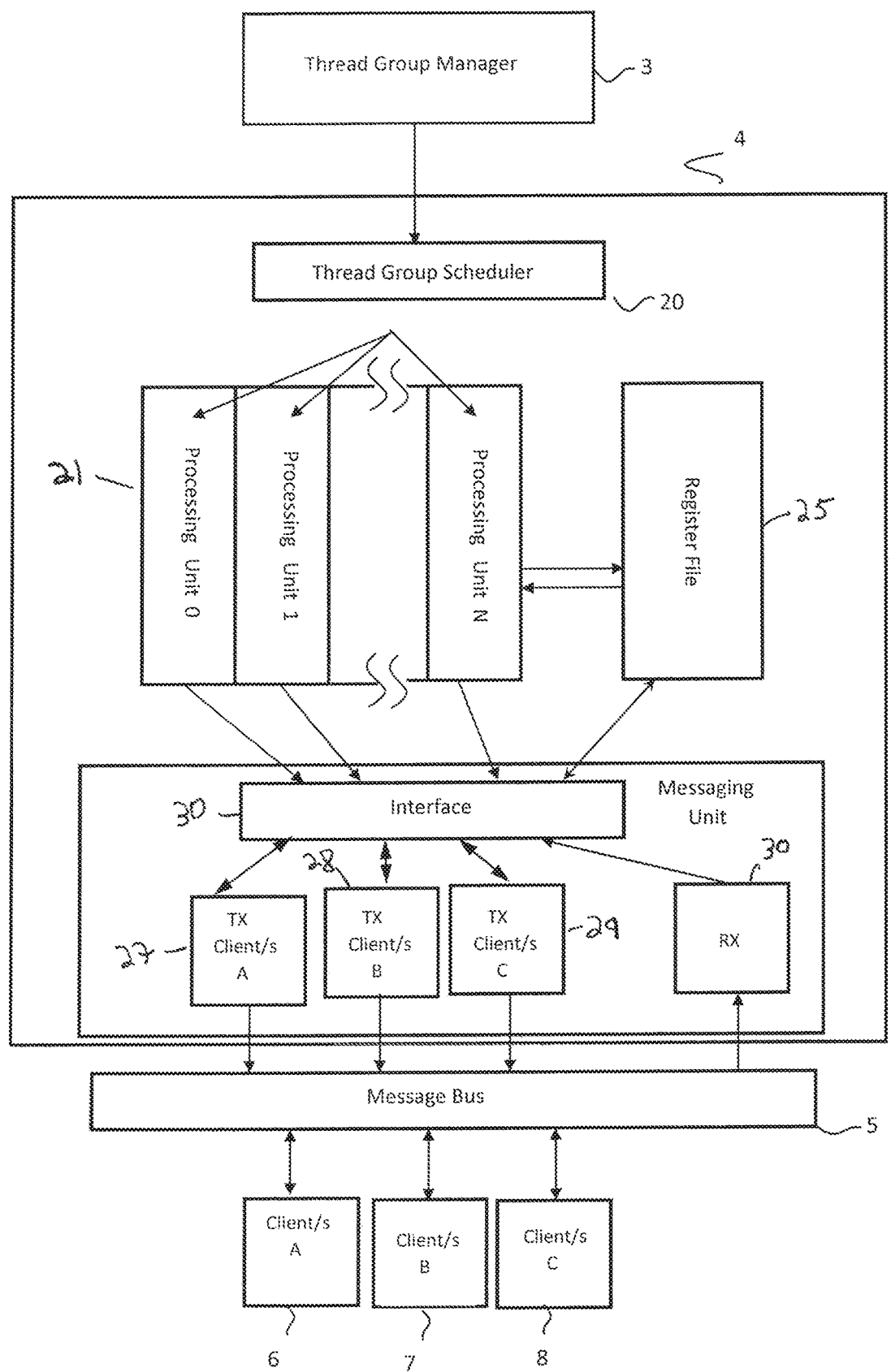
FIG. 2 shows schematically an execution unit of a graphics processing unit in an embodiment of the technology described herein.

FIG. 2 shows schematically an arrangement of an execution unit 4 of a graphics processor that includes message generation circuits in the manner of the technology described herein. This execution unit could be used as the execution unit 4 of the graphics processor shown in FIG. 1, for example.

As shown in FIG. 2, the programmable execution unit 4 (a thread group scheduler 20 of the programmable execution unit 4) will receive thread groups for execution from a thread group manager 3. The thread group scheduler 20 will then trigger appropriate processing units 21 of the execution unit 4 to execute shader programs for the thread groups in the desired and appropriate order.

As shown in FIG. 2, in this embodiment, the execution unit 4 has plural of processing units 21 that can execute instructions in parallel. Each processing unit may comprise a set of one or more functional units that are each operable to perform processing operations to execute and when executing instructions. The processing units 21 (and their functional units) also have access to an associated register file (set of registers) 25 for the execution unit 4. Other arrangements for the processing units, functional units and registers (register file) would, of course, be possible.

As shown in FIG. 2, as well as the processing units 21, the execution unit 4 also includes a messaging unit 26 that includes in this embodiment a plurality of (in this case three) message generation circuits 27, 28, 29 that are each operable to generate messages for sending to a client slave accelerator to cause the slave accelerator to perform a processing operation. (These message generation circuits will be discussed in more detail below.)

As shown in FIG. 2, the message generation circuits 27, 28, 29 can all communicate with respective slave accelerators 6, 7, 8 via the message bus 5.

In the present embodiment, it is assumed that the message generation circuits are arranged such that one message generation circuit generates messages for controlling the texture mapper 7, one message generation circuit generates messages for the varying interpolator 6, and one message generation circuit generates messages for any other accelerators of the graphics processor, such as load and store units, blending units, attribute processing units, and depth and stencil testing units. Other arrangements would be possible, if desired, such as having a single message generation circuit that generates messages for all the accelerators available to the execution unit.

As shown in FIG. 2 (and as will be discussed in more detail below), the message generation circuits 27, 28, 29 are operable to, inter alia, fetch data to be included in messages from the registers (register file) 25 of the execution unit 4. The messaging unit 26 includes an appropriate communications interface and bus 30 that interfaces between the message generation circuits and the registers (register file) for that purpose.

The message unit 26 also includes an appropriate controller 31 operable to receive messages via the message bus 5, such as response messages and signals from the accelerators, and that is operable to perform appropriate controller processing operations in response to any received messages (such as to indicate the completion of an accelerator operation for a given thread group).

FIG. 2 shows the main elements and communications paths, etc., of the execution unit 4 that are relevant to the operation of the present embodiment. As will be appreciated by those skilled in the art, there may be other elements and features of the execution unit and graphics processor that are not illustrated in FIG. 2 (or FIG. 1). It should also be noted here that FIGS. 1 and 2 are only schematic, and that, for example, in practice the various functional units, stages, etc., may share significant hardware circuits, even though they are shown schematically as being separate in the Figures. It will also be appreciated that each stage, element, unit, etc., of the graphics processor and execution unit may be implemented as desired, and will accordingly comprise, e.g., appropriate circuitry/circuits and/or processing logic, etc., for performing the necessary operations and functions.

In operation, the execution unit 4 will fetch, interpret, and execute instructions from a (shader) program stored in memory for respective execution threads.

In the present embodiments, the execution unit is configured to execute shader programs for execution threads as respective groups (warps) of, in this example, 16 execution threads. Thus the processing (functional) units of the execution unit 4 are arranged as 16 respective execution lanes, one for each thread that a thread group may contain. Furthermore, each thread group (warp) is sub-divided into four subsets ("quads") of four threads each.

When executing a shader program, the execution unit 4 may control a slave accelerator 6, 7, 8 to perform a processing operation.

This is done in response to encountering an appropriate "message" instruction in a shader program being executed by the execution unit, that when executed triggers the execution unit 4 to send an appropriate message or messages to the slave accelerator 6, 7, 8 in question.

In the present embodiments, the message instructions that trigger the sending of message(s) to an accelerator indicate the operation to be performed (and thus the accelerator to be used for that operation), and one or more operands (inputs) for the instruction (and that will accordingly be operands (inputs) for the processing operation that the accelerator is to perform).

In the present embodiments, the message instructions that trigger the sending of messages to a slave accelerator can include (indicate) 1 to 4 "source operands" (which contain data values that are to be and need to be processed in some manner, and in an embodiment have their own register file address) and 0 to 8 "staging operands" (that contain data that is to be sent to the slave accelerator for processing in its as fetched form (i.e. unmodified)).

In the present embodiments, the "staging operands" are arranged as a contiguous group of operands in the register file, which can be accessed by "indexed addressing" (i.e. an arrangement in which only the base address of the staging operand group and how many entries (staging operands) there are in the group is indicated (in the message instruction), with the execution unit 4 then determining the actual register file address for each staging operand (register) in the group as a linear sweep starting at the base address and having the prescribed number of address increments. Thus, the staging operands use an index direct addressing scheme, where the first staging register has address "B", and the rest are located at consecutive addresses B+1, B+2, B+3, B+7. The message instruction specifies only B and the number of staging operands register(s) to fetch.

The staging operands may, and in an embodiment do, contain vector data referring to a vertex, or RGBA components (colour+transparency) of a sampling position.

Other arrangements would, of course, be possible.

In the present embodiments, each message instruction indicates the number of source operands and the number of staging operands that the message instruction has associated with it.

In response to a message instruction in a shader program it is executing, the execution unit 4 will generate and send to the appropriate slave accelerator, an appropriate sequence of one or more messages to cause the slave accelerator to perform the desired processing operation. The execution unit will identify the accelerator to use (to send the message(s) to) based on the operation that the message instruction requires to be performed.

The message(s) that are sent from the execution unit to the accelerator convey the information that is required to perform the required processing operation.

In the present embodiments, the messages that are sent from the execution unit to the accelerator have two parts, a header and a payload. The header contains the operation (opcode), any modifiers, the address where the output of the accelerator processing operation should be stored, and information about the size, type and number of values included in the subsequent payload. The payload then contains the input operand data (values).

The messages can be viewed as being "fixed format instructions" which include all the necessary input data for the slave accelerator (and may, e.g., be part of a very small instruction set specific to the slave accelerator in question). As the messages include all the necessary input data themselves, the slave accelerators do not perform any register file fetching.

The messages that are sent to the accelerators are generated and sent by the message generation circuits 27, 28, 29 of the execution unit 4. Thus, when a message instruction is executed in a shader program, that will be indicated to the appropriate message generation circuit (depending upon the slave accelerator that is to perform the operation), so that it can generate and send the required message(s) to the slave accelerator in question. The message instruction is decoded, and the necessary information from the instruction, such as the slave accelerator operation that is required and the identity (addresses) of the operands for that operation, is provided to the message generation circuit.

Figure 3:
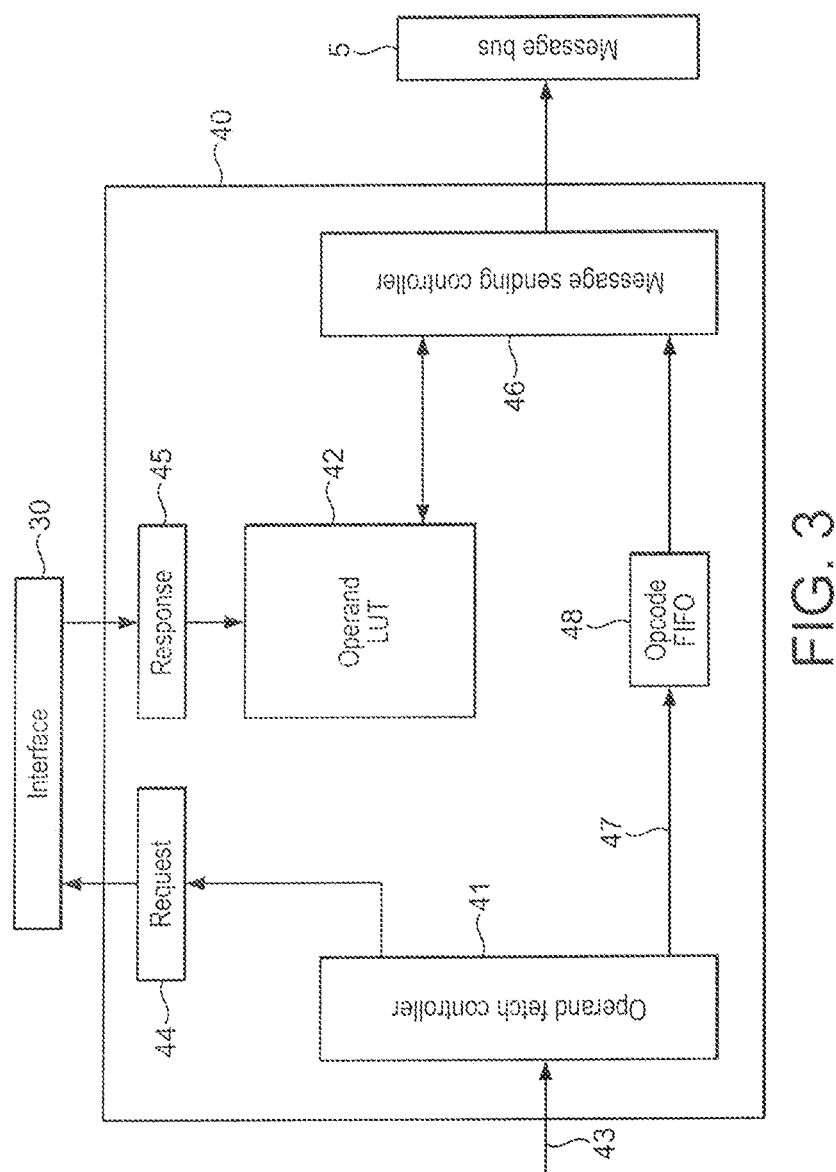
FIG. 3 shows schematically a first embodiment of a message generation circuit.

FIG. 3 shows a first embodiment of the message generation circuits 27, 28, 29. (Each message generation circuit is configured in the manner shown in FIG. 3.)

As shown in FIG. 3, the message generation circuit 40 includes an operand fetch controller 41, in an embodiment in the form of a finite state machine, that performs a data fetching process to fetch the operand data (values) for slave accelerator messages into a local storage 42 of the message generation circuit 40.

The operand fetch controller 41 receives 43 the decoded message instruction indicating that slave accelerator operation is required (and the particular slave accelerator operation that is required), together with the identity of the operands for that operation (for the message instruction), and then fetches the required operand data (values) into the local storage 42 of the message generation circuit.

As shown in FIG. 3, to do this, the message generation circuit comprises an appropriate data request interface (request bus matrix) 44 via which the operand fetch controller can send requests for operand data to the register file of the execution unit where that data is stored. The operand fetch controller sends a request indicating the address of the operand data that is required to the data request interface 44, with the data request interface then operating to fetch the data for the indicated address from the register file 25 where the data (values) for use by the execution unit are stored.

The message generation circuit also comprises a corresponding response interface (response bus matrix) 45 that interfaces with the local storage 42 of the message generation circuit, via which the requested operand data (values) is returned and stored in the local storage 42 of the message generation circuit 40.

The message generation circuit also comprises a message sending circuit 46 that generates the messages that are sent to the accelerators (and that, inter alia, is operable to retrieve operand data (values) from the local storage of the message generation circuit for inclusion in the messages that it generates for sending to the accelerators), in the form of a message generation controller, in an embodiment in the form of a finite state machine.

There is also a communication path 47, that includes a FIFO queue 48, between the operand fetch controller 41 and the message generation controller 46 for conveying the particular operation (opcode) that is being performed to the message sending controller. The message sending controller 46 uses this information to identify the operation when generating messages, and, correspondingly, the operands whose values should be included in the messages.

In the present embodiments, the message generation circuit is configured to fetch in a single fetch cycle, a total amount of data that corresponds to a single operand value for each thread of a thread group (of the size that the execution unit is configured to handle). Thus, where the execution unit is configured to process threads as groups (warps) of 16 threads, and each operand is a 32-bit value, the message generation circuit is able to fetch 16×32=512 bits of data in a single fetch cycle.

In the present embodiments, the message generation circuit can fetch data using three different data "data fetching" modes: a first "all quads" (AQ) mode that fetches a single operand value (the value of the same operand) for each thread of a thread group in a single cycle; a second, "low quads" (LQ) mode that fetches the values for two different operands for each thread of the lower half of the threads (the two "low" quads) of a thread group in a single fetch cycle; and a third, "high quads" (HQ) mode that fetches the values for two different operands for each thread of the upper half of the threads (the two "high" quads) of a thread group in a single fetch cycle.

Thus, an AQ access gives address A to the register file and receives all 4 quads of data for register A (that is 16×32 bit data); an LQ access gives addresses A and usually A+1 to the register file and receives only Quad 0+Quad 1 of data but for 2 registers, A and A+1 (in total 2*2*4=16 threads also); and an HQ access gives also address A and usually A+1 to the register file but receives only Quad 2+Quad 3 (the "High Quads") of data for 2 registers, A and A+1 (in total also 16 threads).

The operand data for the instructions in a shader program being executed is stored in an appropriate distributed and interleaved fashion in the register file (and across different register banks of the register file) of the execution unit, so as to facilitate the message generation circuit being able to fetch operand data from the register file using these different data fetching modes.

In the present embodiments, the data values of "source operands" are fetched using the "all quads" mode. The source operand values are stored in the register file in such a manner so as to facilitate such fetching of those values by the message generation circuit.

On the other hand, the values of "staging operands" for execution threads are fetched using the "low quads" and "high quads" modes. The staging operand values are correspondingly stored in the register file in such a manner so as facilitate such fetching from the register file by the message generation circuit.

Figure 5:
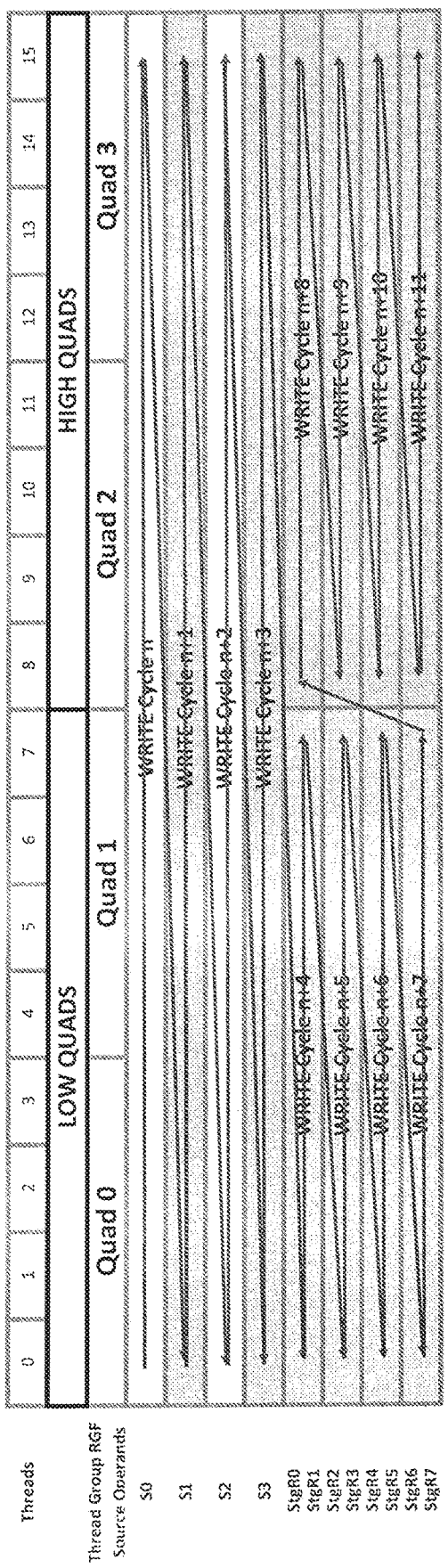
FIG. 5 shows schematically a data fetching sequence in an embodiment of the technology described herein.

FIG. 5 illustrates this, and shows fetching a set of four source operands S0-S3, and a set of 8 staging operands, StgR0-StgR7, for a thread group (warp) of 16 threads over a sequence of 12 fetch cycles.

Figure 4:
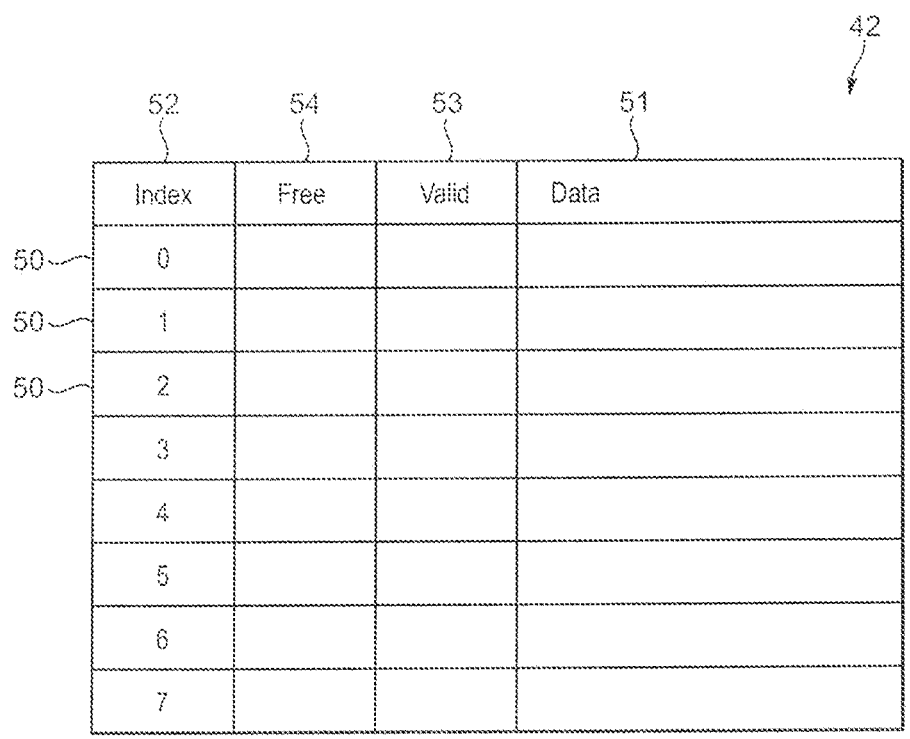
FIG. 4 shows an embodiment of the local storage of a message generation circuit.

FIG. 4 shows the configuration of the local storage 42 of the message generation circuit 40.

As shown in FIG. 4, the local storage 42 of the message generation circuit of the execution unit 4 is in the form of a (lookup) table having a plurality of entries 50, with each entry storing operand data 51 and having the following state information (metadata) associated with it: an index value 52 identifying the entry in the lookup table (the entries are in an embodiment indexed in an ascending numerical order); an indication (flag) 53 indicating whether the entry in question is valid (contains valid data or not); and an indication (flag) 54 indicating whether the entry is free to receive new data (or, correspondingly, is in use (locked) such that the data in the entry should not be overwritten with new data).

In the present embodiment, the local storage lookup table 42 comprises between 4 and 16 entries (has a maximum capacity of between 4 to 16 entries), with each entry able to store the same amount of data as can be fetched by the message generation circuit (from the register file) in a single fetch cycle (so 512 bits of data in the example discussed above, where a 32-bit operand value can be fetched for each of sixteen threads of a thread group in a single cycle).

In the present embodiments, the source operands are stored in different local storage lookup table entries to the staging operands.

Once the necessary operand data for a message instruction has been fetched into the local storage 42 of the message generation circuit, the message generation circuit 40 then includes that data appropriately in a message or messages that are sent to the slave accelerator in question for the slave accelerator to then perform the desired processing operation using the operand data.

In the present embodiments, each message that is sent to a slave accelerator has the capacity to include (and to convey to the accelerator) four operand values (so 4×32=128 bits of data where 32 bit operands are being used). Furthermore, a message generation circuit is only able to send either a single such message or two such messages in a single cycle.

In the present embodiments, the message generation circuit is configured to, and operates to, convey the operand values for an operation to a slave accelerator on a thread quad-by-quad basis, i.e. such that the values of all the operands required by the slave accelerator are sent to the slave accelerator in appropriate messages for respective quads of threads of a thread group in turn.

(This is because the slave accelerators will typically only be able to operate upon a subset of a thread group at a time, such that it is desirable for the messages sent to the slave accelerators to convey all the required data for one subset of threads, so that the slave accelerator can start processing that subset of threads, before moving on to the next subset of threads.)

Figure 6:
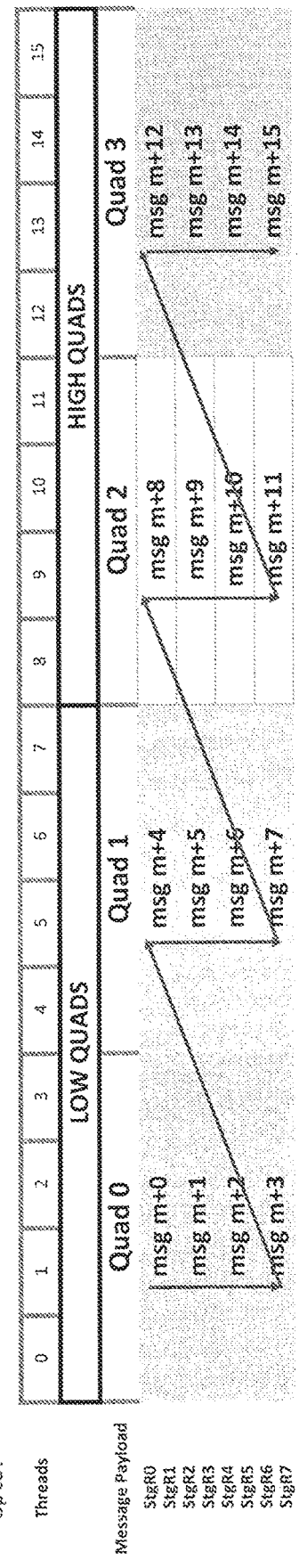
FIG. 6 shows schematically a data sending sequence in an embodiment of the technology described herein.

FIG. 6 illustrates this, and shows the sending of staging operand data StgR0-StgR7 on a thread quad-by-quad basis, over a sequence of 16 sending cycles.

In the present embodiments, the message sending controller 46 will read the required data values from a lookup table entry and then include the data from the lookup table entry in one or more messages that it sends to the accelerator.

The message sending controller may send a single message using data from a lookup table entry, but typically will send a sequence of plural messages using data from a lookup table entry (since, as discussed above, typically any given message conveys less data than would be stored in a single lookup table entry, such that the message sending controller will need to send plural messages to an accelerator in order to convey all the data that is in a lookup table entry to the accelerator).

The message sending controller 46 waits for the required lookup table entry to be indicated (flagged) as containing valid data in the lookup table (which indication is set appropriately once the operand values have been fetched and stored into the lookup table entry), before attempting to read the operand values from the lookup table and including then in a message or messages.

Correspondingly, once the message sending controller 46 has finished with a lookup table entry (has finished using the operand values in that entry for messages to a slave accelerator), it de-allocates (frees-up) the lookup table entry in the local storage lookup table 42 so that it can be reused for new operand data. This is done by setting the "free" indication (flag) associated with the lookup table entry in question accordingly.

The staging operands for a given thread quad are released from the local storage lookup table when the message or messages for the thread quad that those staging operands apply to have been sent to the slave accelerator, but the source operands will be retained in the local storage lookup table until the appropriate messages for the entire thread group in question (that uses those source operand values) have been sent (as source operands will typically be common for an entire thread group (i.e. warp invariant), and so should be retained in the local storage lookup table of the message generation circuit until messages for all the quads for a thread group have been sent to the slave accelerator).

The operand data may be arranged in the entries in the lookup table 42 in any suitable and desired manner.

In a first embodiment, there is a static (fixed) mapping between the operands that a message instruction may relate to (the relative operand position for a message instruction) and the entries in the local storage lookup table 42 of the message generation circuit 40 where the values for those operands are stored. In other words, for every message instruction, the first operand of the instruction will always be stored in a first particular entry in the lookup table, the second operand for each message instruction will always be stored in a second, different, particular entry in the lookup table, and so on.

In one embodiment of such an arrangement, the local storage lookup table 42 has sufficient entries and capacity to store operand data (values) for executing a single message instruction for a thread group.

FIG. 7 illustrates such an arrangement and shows the operation over a sequence of three exemplary instructions 70 in the case where the local storage lookup table 42 has seven entries (useable storage locations).

FIG. 7 shows exemplary instructions to be executed for a full thread group, and containing three source operands and four staging operands each. Other types of instructions, other combinations of source operands and staging operands, and of fetching modes may be used, and can be (and are) supported, e.g., with these parameters changing for different instructions in the instruction stream, as required and appropriate.

FIG. 7 shows the data 71 that is fetched into the local storage lookup table 42 of the message generation circuit on each clock cycle 72 as the instruction sequence 70 is executed ("bubble" indicates that no data is fetched in that cycle), the allocation 73 of the data to the respective local storage lookup table entries, and the data that is included in each message 74 that is sent to a slave accelerator in each clock cycle (as the data is drained from the local storage lookup table 42). In this Figure it is assumed that the message generation circuit can send 74 data of two registers for a quad to a slave accelerator in each clock cycle.

FIG. 7 also shows the releasing 75 of the local storage lookup table entries when they are finished with.

It can be seen that in this case the local storage lookup table supports only one instruction inflight at any one time, and in the illustrated scenario of three instructions takes 36 clock cycles to complete (assuming the message sending process does not back-stall at all).

In another embodiment of such a "static" arrangement, the local storage lookup table 42 has capacity to store operand data (values) for two instructions (for two thread groups) simultaneously (but still statically allocated to respective operand positions of the instructions).

In this case, the local storage lookup table 42 is essentially configured as two parallel lookup tables (to have two parts), with one of the lookup tables (parts) being statically allocated to the odd instruction of a pair of sequential message instructions, and the other lookup table (part) then being allocated to the even instruction of the pair (and so on, with the lookup table (part) being used thus changing (alternating) for each successive message instruction that is to be executed).

FIG. 8 illustrates this, and shows the execution of the same sequence 70 of instructions as FIG. 7, but with a local storage lookup table that has more storage area so as to be able to store operand data (values) for two instructions (for two thread groups) simultaneously, with the "even" instructions statically allocated to the left storage area 80 and the "odd" instructions statically allocated to the right storage area 81. In this example, each storage area 80, 81 has five entries (useable storage locations) (and so the total storage capacity of the local storage lookup table is ten entries). Other arrangements would, of course, be possible.

This arrangement supports two instructions in flight, and is faster, as it requires only 33 cycles for the same scenario of three instructions. (Again, it is assumed that the message generation circuit can send data of two registers for a quad to a slave accelerator in each clock cycle.)

Figure 9:
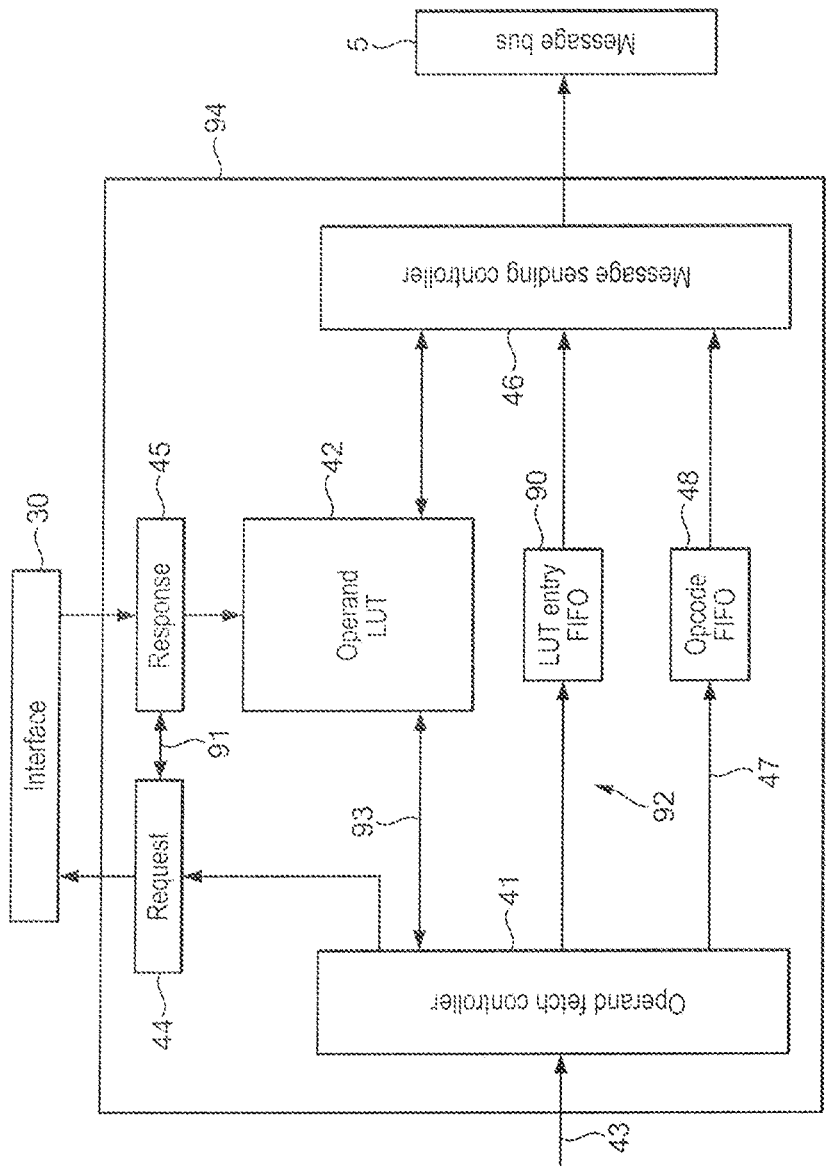
FIG. 9 shows another embodiment of the local storage of a message generation circuit.
Figure 10:
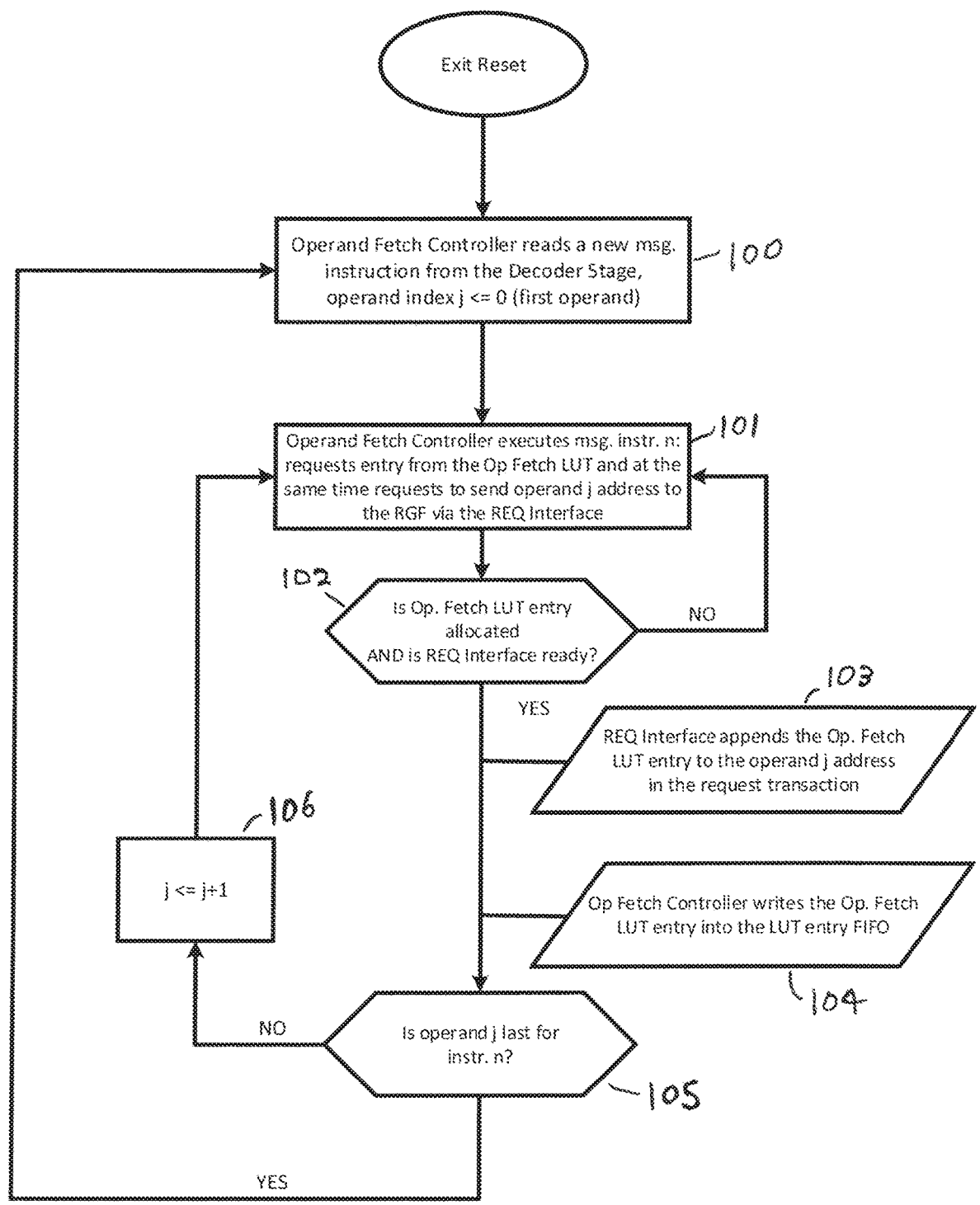
FIGS. 10 and 11 shows schematically the operation of the message generation circuit of FIG. 9.
Figure 11:
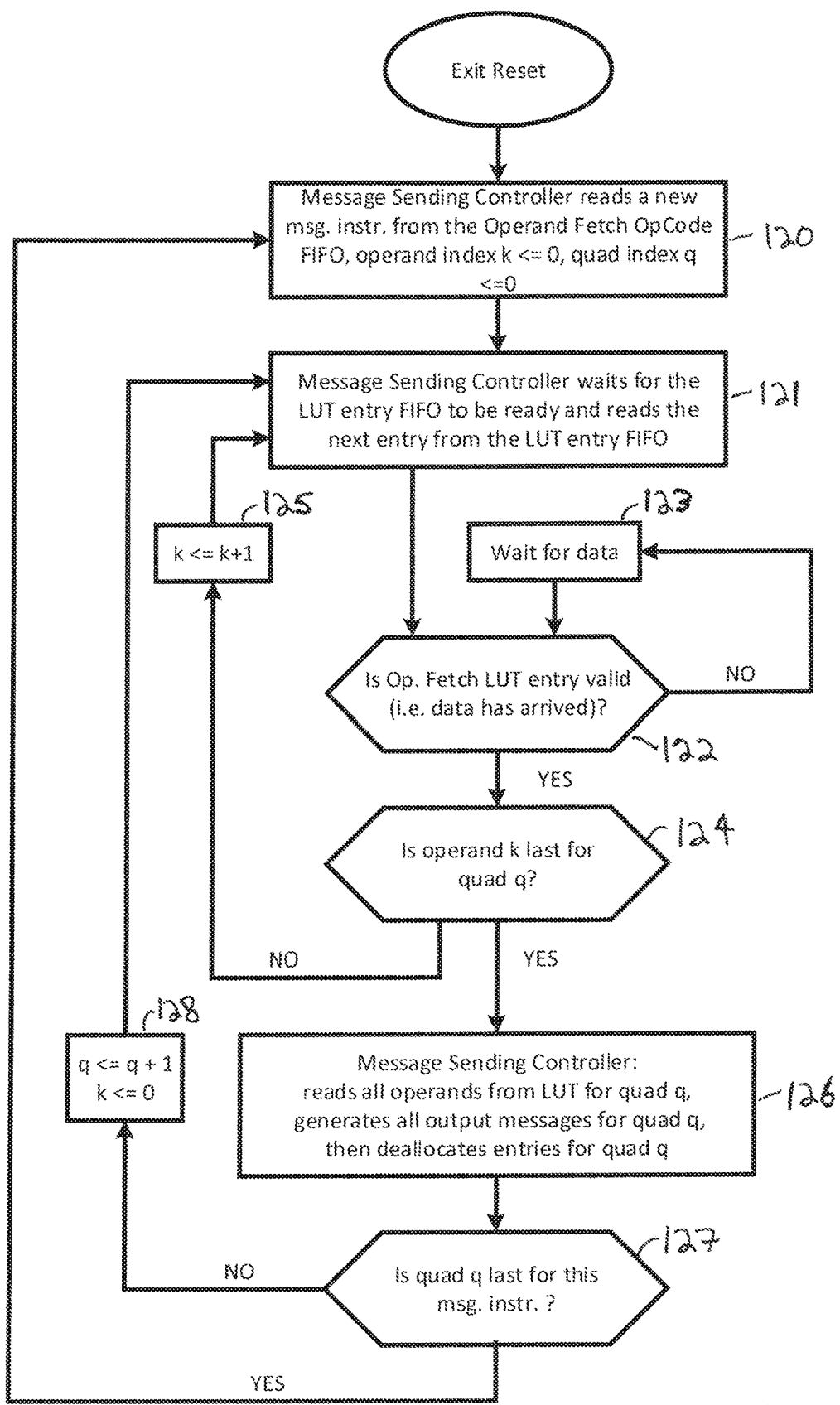

FIGS. 9, 10 and 11 show another embodiment of the message generation circuit in which rather than having a static mapping between operands ((relative) operand position) and the entries in the message generation circuit local storage lookup table 42, the mapping between instruction operands and the entries in the lookup table 42 is dynamic, i.e. such that a given operand will be dynamically allocated an entry in the lookup table (for its data) in use. In other words, any operand can be stored in any entry in the lookup table 42 (that is free to store data). This allows a higher throughput to be achieved with a smaller local storage lookup table.

FIG. 9 shows the configuration of the message generation circuit 94 in this embodiment.

As can be seen, the message generation circuit 94 in this embodiment is similar to the message generation circuit 40 shown in FIG. 3 (and is the same as and operates in the same manner as the message generation circuit shown in and described with reference to FIG. 3, unless otherwise indicated), save that there is an additional data path 90 whereby the operand fetch controller 41 can request the allocation of an entry in the local storage lookup table 42 for operand values that it is to fetch, there is a data path 91 between the request interface 44 and the response interface 45 for conveying the identity of an allocated lookup table entry to the response interface 45 (this will be discussed further below), and there is a data path 92, which includes a lookup table entry FIFO (queue) 90, into which the identity of an allocated lookup table entry for a set of operands is written by the operand fetch controller 41 so as to be available to the message sending controller 46.

In this embodiment, when the values of an operand are to be fetched into the local storage lookup table 42, the operand fetch controller 41 first requests a free entry in that table in which the operand values can be stored, with the operand values then being fetched and stored in that entry.

Correspondingly, the identity of the entry in which the operand values have been stored is conveyed to the message sending controller 46, such that the message sending controller can then identify the correct lookup table entry to retrieve the operand values for inclusion in the message(s) to the accelerator from.

To do this, the operand fetch controller 41 writes the identity of the allocated lookup table entry into the FIFO (queue) 90, from which the message sending controller 46 will then retrieve the lookup table entry identity when it is assembling messages that require those operand values for sending to a slave accelerator to thereby identify the lookup table entry where the operand values are stored.

FIGS. 10 and 11 show this operation in more detail. FIG. 10 shows the operation of the operand fetch controller 41 in this embodiment, and FIG. 11 shows the operation of the message sending controller 46.

As shown in FIG. 10, when the operand fetch controller receives (reads) a new message instruction to be executed (step 100), it executes that instruction, and as part of that processing requests an entry via the data path 93 from the local storage lookup table 42 for storing the operands for the message instruction in, and sends a request to send the operand address to the register file via the request interface 44 (step 101).

Thus, in this embodiment, when the values of an operand are to be fetched into the local storage lookup table, the operand fetch controller 41 first queries the lookup table 42 to identify a free entry in that table in which the operand values will be stored. In the present embodiment, the lowest lookup table entry (the lowest index lookup table entry) that is free is selected and allocated for storing the new operand values.

(If no entries in the lookup table are free, the fetch of the operand values is stalled until a lookup table entry becomes free.)

Once it has been allocated a lookup table entry, and the request interface 44 is ready (step 102), the request interface 44 sends a request transaction to request the operand values from the register file, and associates with that request the identity (index) of the lookup table entry that has been allocated to store the operand values (step 103).

Thus, the operand request to the request interface 44 includes both the address of the operand data that is required and the identity of the allocated lookup table entry.

The identity of the allocated lookup table entry is transferred to the response interface 45 from the request interface 44 via the data path 91. When the operand data is returned from the register file in response to the fetch request, the response interface 45 uses that transferred lookup table entry identity associated with (sent with) the fetch request to identify which lookup table entry to store the returned operand values in, and stores the operand values in the lookup table 42 in the allocated lookup table entry accordingly.

In addition to sending the identity of the allocated lookup table entry with the operand data fetch request, the identity of the allocated lookup table entry is also conveyed to the message sending controller 46 (so that the message sending controller can then use that identity of the lookup table entry to retrieve the operand values in question from the local storage lookup table 42), by writing the (identity of the) allocated local storage lookup table entry into the lookup table entry FIFO (queue) 90 (step 104).

(The opcode for the message instruction is also written into the opcode FIFO 48 so that the message sending controller can identify the operation that is to be performed using the operand values.)

This process is repeated for each operand of the message instruction in question (steps 105 and 106), and then for the next message instruction to be executed, and so on.

FIG. 11 shows the operation of the message sending controller 46.

As shown in FIG. 11, the message sending controller will read a new message instruction from the operation (opcode) FIFO 48 (step 120).

The message generation controller then waits for the lookup table entry FIFO 90 to be ready and reads the next entry from the lookup entry FIFO (which will indicate the entry in the local storage lookup table 42 where the operands for the message instruction in question will be stored) (step 121).

The providing of information indicating the particular operation that is to be performed using the fetched operand data and the providing of the identity of the allocated lookup table entries for the respective accelerator operations to the message sending controller 46 is appropriately coordinated and synchronised, such that the identity of the required lookup table entry will be at the head of the queue 90 when the particular operation that is to use the operand values in the entry in question is read by the message sending controller from the "opcode" queue 48.

Thus, in the present embodiments, the accelerator operations that are to be performed are conveyed to the message sending controller in a particular sequence, and the identities of the allocated lookup table entries for those operations are placed into the FIFO queue 90 (and retrieved from the queue by the message sending controller) in that same, particular, sequence.

The message sending controller then waits for the local storage lookup table 42 entry to be indicated as being valid (i.e. that the data has been fetched from the register file and stored in the operand lookup table entry) (steps 122 and 123). To facilitate this, the lookup table entry FIFO 90 is sized such that the identity of a lookup table entry for the message sending controller to use should only reach the head of the queue after the lookup table entry in question will have been filled with the required operand data (values).

This process is repeated for each operand whose value is required for the thread quad for which messages are to be sent for the message instruction in question (steps 124 and 125). (As discussed above, in the present embodiments, messages are sent to a slave accelerator on a thread quad by thread quad basis, so the message sending controller configures a set of messages for each quad of a thread group in turn, i.e. assembles and sends messages for one quad of a thread group before doing the same for the next quad, and so on. As such, the message sending controller 46 is operable to fetch all the operand values for a particular quad before sending messages for that quad (and before fetching any operand values for the next quad).)

Once all the local storage lookup table entries storing operand values for the thread quad in question are valid (i.e. contain the required operand data), then the message sending controller reads all the operands from the lookup table 42 for the quad in question, generates and sends all output messages for that thread quad to the slave accelerator, and then de-allocates the relevant lookup table entries storing the operand values for that quad so that they are available for reuse (step 126).

This is repeated for each quad of the thread group that is executing the message instruction in question (steps 127 and 128), and then the process moves on to the next message instruction, and so on.

FIG. 12 shows the execution of the same sequence 70 of instructions as FIGS. 7 and 8, but with a local storage lookup table arrangement and operation as shown in FIGS. 9, 10 and 11. (Again, the message generation circuit can send data of two registers for a quad to a slave accelerator in each clock cycle.)

In this case, it is assumed that the local storage lookup table 42 has seven entries (storage locations) for storing operand data (like in the arrangement shown in FIG. 7). Other arrangements, would, of course, be possible.

As shown in FIG. 12, in this case, the operand values are allocated to local storage lookup table entries in a dynamic manner (rather than there being a fixed mapping between the operands and the entries in which they are stored in the local storage lookup table 42). Thus, as shown in FIG. 12, a given operand can use different entries for different instructions.

As can be seen, the same scenario of three instructions takes 33 cycles in this arrangement, like in FIG. 8, but the local storage lookup table 42 only requires seven entries, rather than ten entries (and so requires a smaller area). Correspondingly, although the local storage lookup table in the arrangement shown in FIG. 12 has the same number of entries (area) as the arrangement shown in FIG. 7, it can execute the same scenario of three instructions faster (in 33 cycles compared to 36 cycles).

Once the message generation circuit has sent the appropriate messages to a slave accelerator, then the slave accelerator will perform the required processing operations using the operand data (values) conveyed in the messages that it has received from the message generation circuit, and then return the result of its processing to the execution unit (or otherwise store or transmit that result, as appropriate). The execution unit may, for example, continue execution of the shader program in question (beyond the message instruction that triggered the slave accelerator operation), using the results returned by the accelerator, to complete the execution of the shader program and the processing of the work items, etc., in question.

The final result (output) of the shader program execution can then be used as desired, e.g. stored in memory for further processing and/or for display.

The technology described herein can be used for all forms of output that a graphics processor may be used to generate, such as frames (images) for display, render-to-texture outputs, etc. The output, e.g. fragment shaded, data values from the graphics processing are in an embodiment exported to external, e.g. main, memory, for storage and use, such as to a frame buffer for a display.

Although the present embodiments have been described above with particular reference to the execution of shader programs in graphics processing units, the operation in the manner of the present embodiments may equally be used in other processors and not just graphics processors.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A processor comprising:
an execution unit operable to execute programs to perform processing operations; and
one or more slave accelerators each operable to perform respective processing operations;
wherein:
the execution unit is operable to communicate with the slave accelerators to cause the slave accelerators to perform processing operations, and to receive responses from the slave accelerators;
and
the execution unit comprises:
a message generation circuit configured to generate messages for sending to a slave accelerator to cause the slave accelerator to perform a processing operation;
the message generation circuit comprising:
local storage operable to store data values for including in a message or messages to be sent to a slave accelerator pending the inclusion of those data values in a message that is sent to a slave accelerator;
a data fetching circuit configured to fetch into the local storage of the message generation circuit data values to be used by a slave accelerator when performing a processing operation;
and
a message sending circuit configured to, when a message including a data value or values is to be sent to a slave accelerator, retrieve the data value or values for inclusion in the message to be sent to the slave accelerator from the local storage of the message generation circuit, and send a message including the retrieved data value or values to the slave accelerator;
wherein in one message sending mode the message sending circuit is operable to send data values in messages to the slave accelerator in a different order to the order in which those data values are fetched into the local storage of the message generation circuit by the data fetching circuit;
wherein the message generation circuit comprises a communication path between the data fetching circuit and the message sending circuit for conveying a processing operation that is to be performed by a slave accelerator to the message sending circuit;
wherein the data fetching circuit is configured to, when fetching into the local storage of the message generation circuit the data value or values to be used by a slave accelerator when performing a processing operation:
obtain an entry in the local storage in which the data value or values will be stored;
convey the identity of the local storage entry that has been allocated to store the data value or values to the message sending circuit by writing the identity of the allocated local storage entry into a queue from which the message sending circuit will then retrieve the local storage entry identity when it is sending a message that requires the data value or values to a slave accelerator; and fetch the data value or values into the allocated local storage entry;

wherein the message sending circuit is configured to, when retrieving the data value or values for inclusion in the message to be sent to the slave accelerator from the local storage of the message generation circuit:

retrieve the local storage entry identity from the queue;

use the retrieved local storage entry identity to identify the local storage entry where the data value or values are stored; and retrieve the data value or values from the identified local storage entry.

2. The processor of claim 1, wherein the message generation circuit comprises:

a data request interface via which the data fetching circuit can send requests for operand data from the storage of the execution unit where that data is stored; and a response data interface that interfaces with the local storage of the message generation circuit, via which the requested data values are returned and stored in the local storage of the message generation circuit.

3. The processor of claim 1, wherein the message generation circuit is operable to fetch in a single fetch cycle: a single operand value for each thread of a thread group that the execution unit is configured to handle.

4. The processor of claim 1, wherein each message that is sent to a slave accelerator has the capacity to convey the value of a particular operand for only a subset of the threads of a thread group that the execution unit is configured to handle.

5. The processor of claim 1, wherein the local storage of the message generation circuit is in the form of a lookup table having a plurality of entries, with each entry able to store one or more data values, and having associated with it one or more of: an index value identifying the entry in the lookup table; an indication of whether the entry in question is valid; and an indication of whether the entry is free to receive new data.

6. The processor of claim 1, wherein the mapping between the relative operand positions for a message instruction and the entries in the local storage of the message generation circuit where the values for the operands will be stored are set in use, when operand values are to be stored in the local storage.

7. The processor of claim 1, wherein the processor is a graphics processor.

8. The processor of claim 1, wherein the message generation circuit is operable to fetch in a single fetch cycle: in a first data fetching mode, a single operand value for each of a plurality of threads of a thread group that the execution unit is configured to handle; and in a second data fetching mode, plural operand values for each thread of a subset of the threads of a thread group that the execution unit is configured to handle.

9. A method of operating a processor, the processor comprising:

an execution unit operable to execute programs to perform processing operations; and one or more slave accelerators each operable to perform respective processing operations;

wherein:

the execution unit is operable to communicate with the slave accelerators to cause the slave accelerators to perform processing operations, and to receive responses from the slave accelerators;

and the execution unit comprises:

a message generation circuit configured to generate messages for sending to a slave accelerator to cause the slave accelerator to perform a processing operation, the message generation circuit comprising:

local storage operable to store data values for including in a message or messages to be sent to a slave accelerator pending the inclusion of those data values in a message that is sent to a slave accelerator;

a data fetching circuit configured to fetch into the local storage of the message generation circuit data values to be used by a slave accelerator when performing a processing operation;

a message sending circuit configured to, when a message including a data value or values is to be sent to a slave accelerator, retrieve the data value or values for inclusion in the message to be sent to the slave accelerator from the local storage of the message generation circuit, and send a message including the retrieved data value or values to the slave accelerator; and a communication path between the data fetching circuit and the message sending circuit for conveying a processing operation that is to be performed by a slave accelerator to the message sending circuit;

wherein in one message sending mode the message sending circuit is operable to send data values in messages to the slave accelerator in a different order to the order in which those data values are fetched into the local storage of the message generation circuit by the data fetching circuit;

the method comprising:

when a message including a data value or values is to be sent to a slave accelerator:

fetching the data value or values for inclusion in the message to be sent to the slave accelerator into the local storage of the message generation circuit; and conveying the processing operation that is to be performed by the slave accelerator over the communication path to the message sending circuit;

wherein fetching the data value or values for inclusion in the message to be sent to the slave accelerator into the local storage of the message generation circuit comprises:

obtaining an entry in the local storage in which the data value or values will be stored;

conveying the identity of the local storage entry that has been allocated to store the data value or values to the message sending circuit by writing the identity of the allocated local storage entry into a queue from which the message sending circuit will then retrieve the local storage entry identity when it is sending a message that requires the data value or values to a slave accelerator; and fetching the data value or values into the allocated local storage entry;

the method further comprising:

the message sending circuit:

retrieving the local storage entry identity from the queue;

using the retrieved local storage entry identity to identify the local storage entry where the data value or values are stored;

retrieving the data value or values from the identified local storage entry of the local storage; and sending a message including the retrieved data value or values to the slave accelerator;

wherein in one message sending mode, the order in which data values are sent in messages to the slave accelerator is different to the order in which those data values are fetched into the local storage of the message generation circuit.

10. The method of claim 9, wherein the local storage of the message generation circuit is in the form of a lookup table having a plurality of entries, with each entry able to store one or more data values, and having associated with it one or more of: an index value identifying the entry in the lookup table; an indication of whether the entry in question is valid; and an indication of whether the entry is free to receive new data.

11. The method of claim 9, wherein the mapping between the relative operand positions for a message instruction and the entries in the local storage of the message generation circuit where the values for the operands will be stored is set dynamically in use, when operand values are to be stored in the local storage.

12. The method of claim 9, comprising:
sending with a request for operand values to be fetched, the identity of the local storage entry that has been allocated to store the operand values; and
using the identity of the local storage entry that has been allocated to store the operand values sent with the fetch request to identify which local storage entry to store the fetched operand values in, and storing the operand values in the local storage in the allocated local storage entry.

13. A non-transitory computer readable storage medium storing software code which when executing on a processor performs a method of operating a processor, the processor comprising:
an execution unit operable to execute programs to perform processing operations; and
one or more slave accelerators each operable to perform respective processing operations;
wherein:
the execution unit is operable to communicate with the slave accelerators to cause the slave accelerators to perform processing operations, and to receive responses from the slave accelerators; and
the execution unit comprises:
a message generation circuit configured to generate messages for sending to a slave accelerator to cause the slave accelerator to perform a processing operation, the message generation circuit comprising:
local storage operable to store data values for including in a message or messages to be sent to a slave accelerator pending the inclusion of those data values in a message that is sent to a slave accelerator;
a data fetching circuit configured to fetch into the local storage of the message generation circuit data values to be used by a slave accelerator when performing a processing operation;
a message sending circuit configured to, when a message including a data value or values is to be sent to a slave accelerator, retrieve the data value or values for inclusion in the message to be sent to the slave accelerator from the local storage of the message generation circuit, and send a message including the retrieved data value or values to the slave accelerator; and
a communication path between the data fetching circuit and the message sending circuit for conveying a processing operation that is to be performed by a slave accelerator to the message sending circuit;
wherein in one message sending mode the message sending circuit is operable to send data values in messages to the slave accelerator in a different order to the order in which those data values are fetched into the local storage of the message generation circuit by the data fetching circuit;
the method comprising:
when a message including a data value or values is to be sent to a slave accelerator:
fetching the data value or values for inclusion in the message to be sent to the slave accelerator into the local storage of the message generation circuit; and
conveying the processing operation that is to be performed by the slave accelerator over the communication path to the message sending circuit;
wherein fetching the data value or values for inclusion in the message to be sent to the slave accelerator into the local storage of the message generation circuit comprises:
obtaining an entry in the local storage in which the data value or values will be stored;
conveying the identity of the local storage entry that has been allocated to store the data value or values to the message sending circuit by writing the identity of the allocated local storage entry into a queue from which the message sending circuit will then retrieve the local storage entry identity when it is sending a message that requires the data value or values to a slave accelerator; and
fetching the data value or values into the allocated local storage entry;
the method further comprising:
the message sending circuit:
retrieving the local storage entry identity from the queue;
using the retrieved local storage entry identity to identify the local storage entry where the data value or values are stored;
retrieving the data value or values from the identified local storage entry of the local storage of the message generation circuit; and
sending a message including the retrieved data value or values to the slave accelerator;
wherein in one message sending mode, the order in which data values are sent in messages to the slave accelerator is different to the order in which those data values are fetched into the local storage of the message generation circuit.

* * * * *